United States Patent
Ratkowiak

(10) Patent No.: US 12,498,069 B2
(45) Date of Patent: Dec. 16, 2025

(54) ADDITIVE MANUFACTURED HYDRAULIC SWIVEL BOLT; AND METHOD

(71) Applicant: EATON INTELLIGENT POWER LIMITED, Dublin (IE)

(72) Inventor: Stephen A. Ratkowiak, Ann Arbor, MI (US)

(73) Assignee: Eaton Intelligent Power Limited, Dublin (IE)

( * ) Notice: Subject to any disclaimer, the term of this patent is extended or adjusted under 35 U.S.C. 154(b) by 0 days.

(21) Appl. No.: 18/257,260

(22) PCT Filed: Dec. 14, 2021

(86) PCT No.: PCT/EP2021/025500
§ 371 (c)(1),
(2) Date: Jun. 13, 2023

(87) PCT Pub. No.: WO2022/128158
PCT Pub. Date: Jun. 23, 2022

(65) Prior Publication Data
US 2024/0044432 A1 Feb. 8, 2024

Related U.S. Application Data

(60) Provisional application No. 63/217,072, filed on Jun. 30, 2021, provisional application No. 63/125,239, filed on Dec. 14, 2020.

(51) Int. Cl.
*F16L 39/06* (2006.01)
*B33Y 80/00* (2015.01)
*F16L 27/093* (2006.01)

(52) U.S. Cl.
CPC ............. *F16L 39/06* (2013.01); *F16L 27/093* (2013.01); *B33Y 80/00* (2014.12)

(58) Field of Classification Search
CPC ....... F16L 27/087; F16L 27/093; F16L 39/04; F16L 39/06
See application file for complete search history.

(56) References Cited

U.S. PATENT DOCUMENTS

| | | | | |
|---|---|---|---|---|
| 1,290,869 A | * | 1/1919 | Austin | F16L 39/06 285/273 |
| 1,665,655 A | * | 4/1928 | Clisson | F16L 39/04 285/356 |

(Continued)

FOREIGN PATENT DOCUMENTS

| | | |
|---|---|---|
| EP | 3604885 A1 | 2/2020 |
| EP | 3736210 A1 | 11/2020 |
| FR | 3062447 A1 | 8/2018 |

OTHER PUBLICATIONS

International Search Report and Written Opinion received for PCT Application No. PCT/EP2021/025500 on Aug. 1, 2022, 19 pgs.

(Continued)

*Primary Examiner* — Zachary T Dragicevich
*Assistant Examiner* — Alexander T Rufrano
(74) *Attorney, Agent, or Firm* — Merchant & Gould P.C.

(57) ABSTRACT

A hydraulic swivel bolt includes a main body manufactured using additive manufacturing, defining at least two parallel fluid passages extending between opposite ends. A first shaft and a second shaft are positioned at respective ends of the main body, with at least one of the fluid passages providing fluid communication between the shafts. Each shaft includes axially separated first and second ports in communication with respective fluid passages. The first and second shafts also provide sealing surfaces for tubular sleeves, which are rotatable about a rotational axis.

7 Claims, 31 Drawing Sheets

(56) References Cited

U.S. PATENT DOCUMENTS

| | | | | | |
|---|---|---|---|---|---|
| 1,872,666 | A | * | 8/1932 | Brownell | F16L 39/04 |
| | | | | | 285/221 |
| 2,659,615 | A | * | 11/1953 | Mcclain | F16L 39/06 |
| | | | | | 285/190 |
| 2,790,426 | A | * | 4/1957 | Mueller | F16L 27/093 |
| | | | | | 285/190 |
| 3,726,318 | A | * | 4/1973 | Hyde | E03C 1/0404 |
| | | | | | 137/625.41 |
| 10,844,969 | B2 | * | 11/2020 | Rosko | E03C 1/0401 |
| 11,181,209 | B2 | * | 11/2021 | Magalhaes | F16L 3/015 |
| 11,312,483 | B2 | * | 4/2022 | Leong | F16L 39/04 |
| 2019/0376620 | A1 | | 12/2019 | Anthony | |
| 2020/0208752 | A1 | | 7/2020 | Scot | |

OTHER PUBLICATIONS

Office Action dated Aug. 19, 2025, EP Application No. 21839333.8, 9 pages.

* cited by examiner

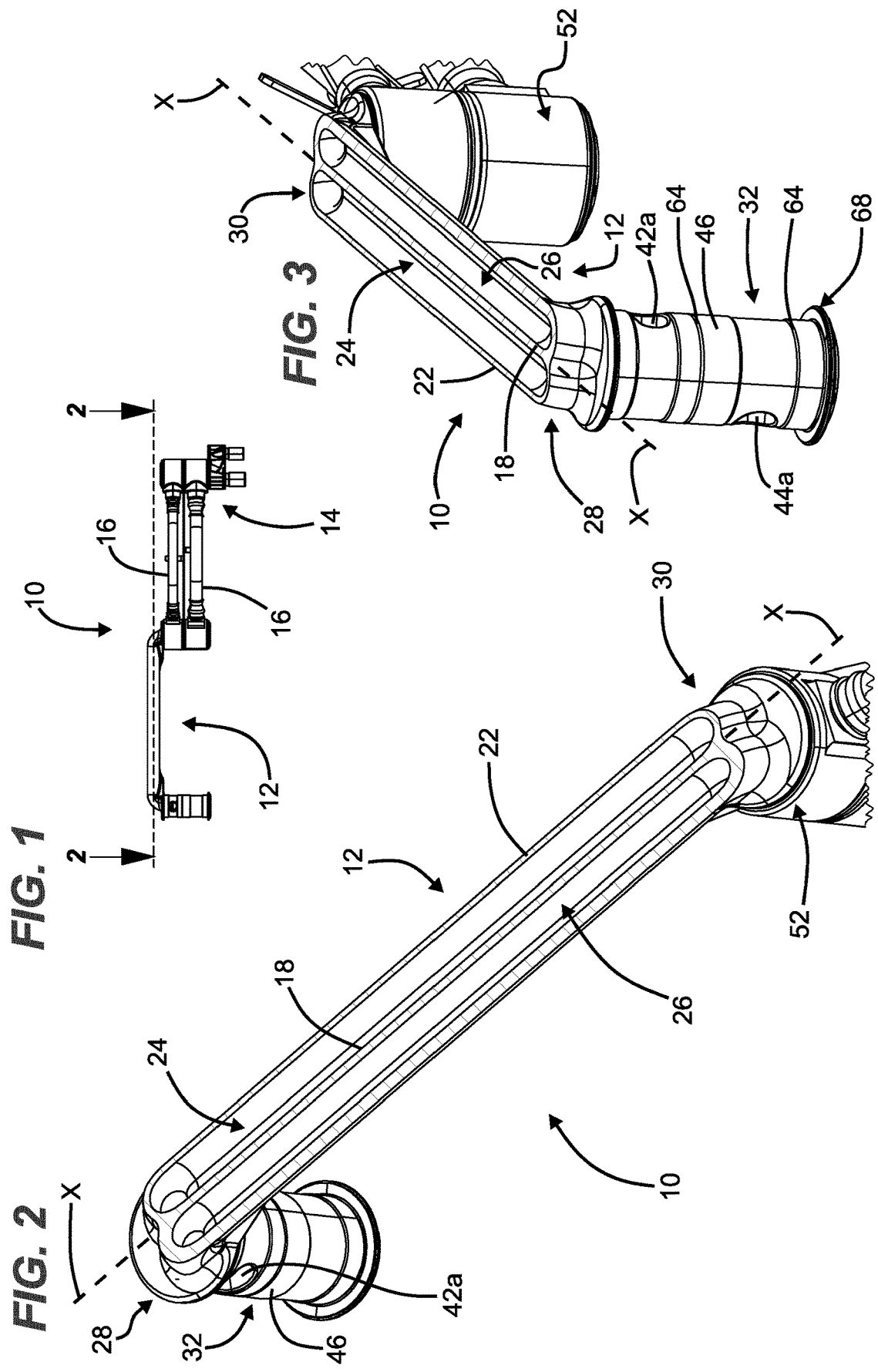

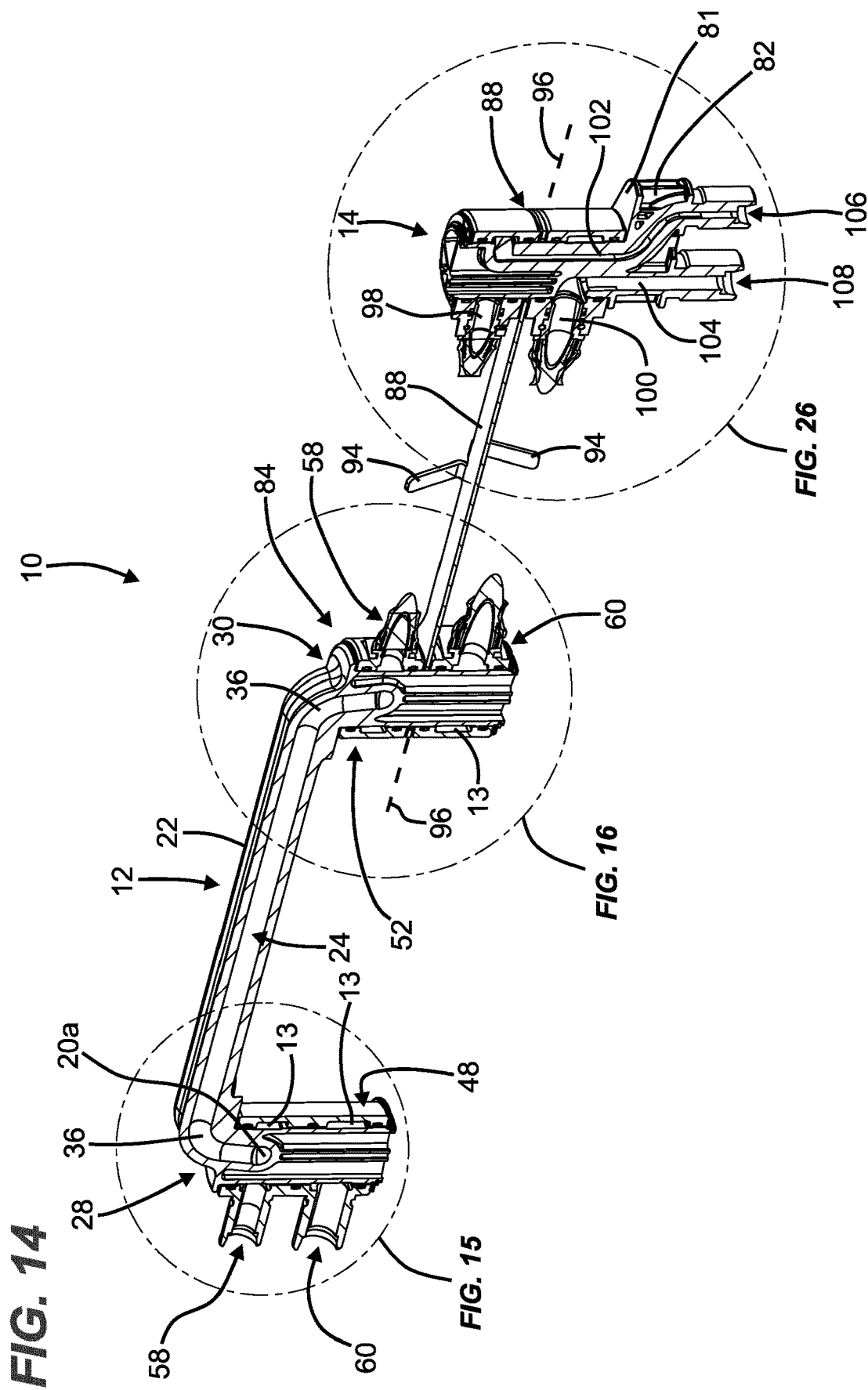

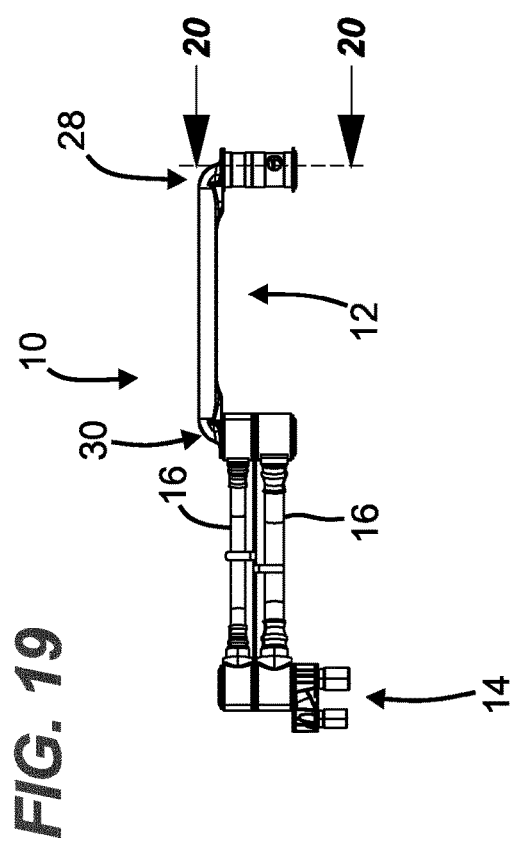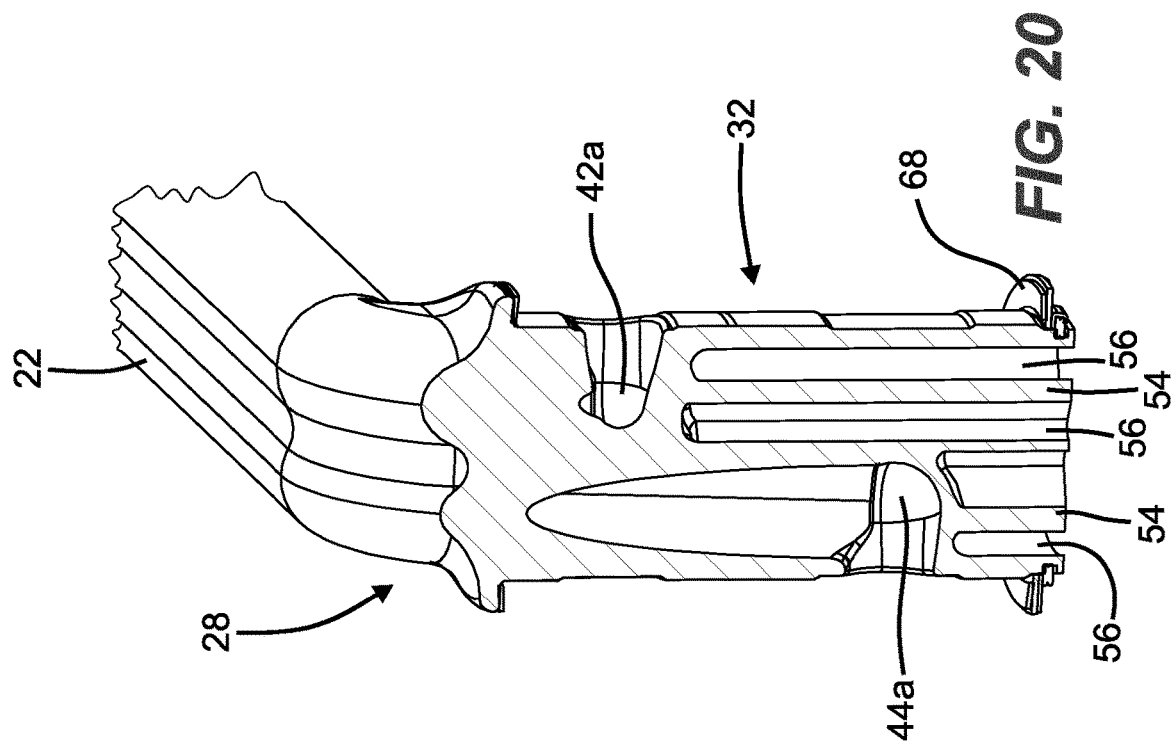

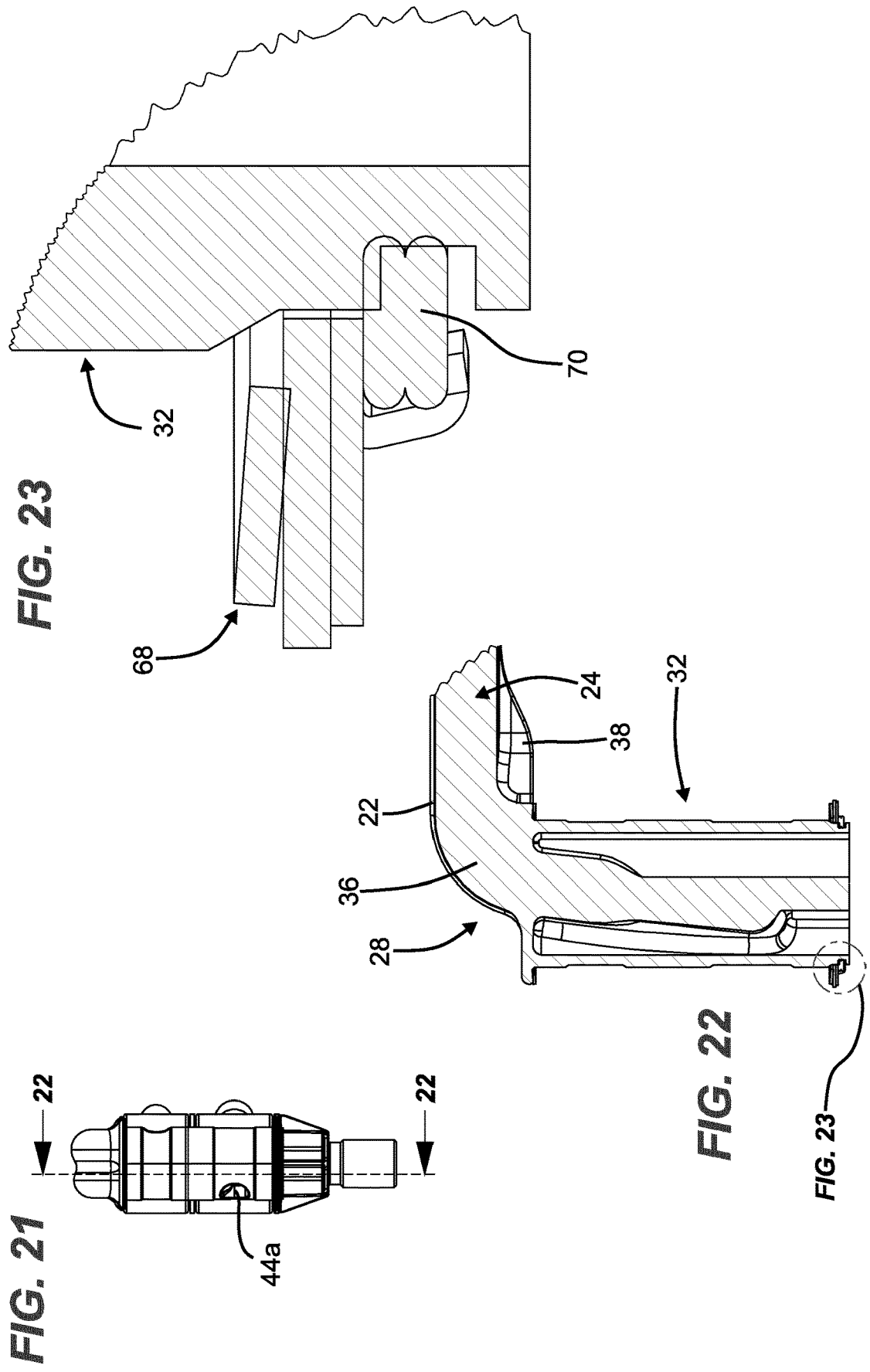

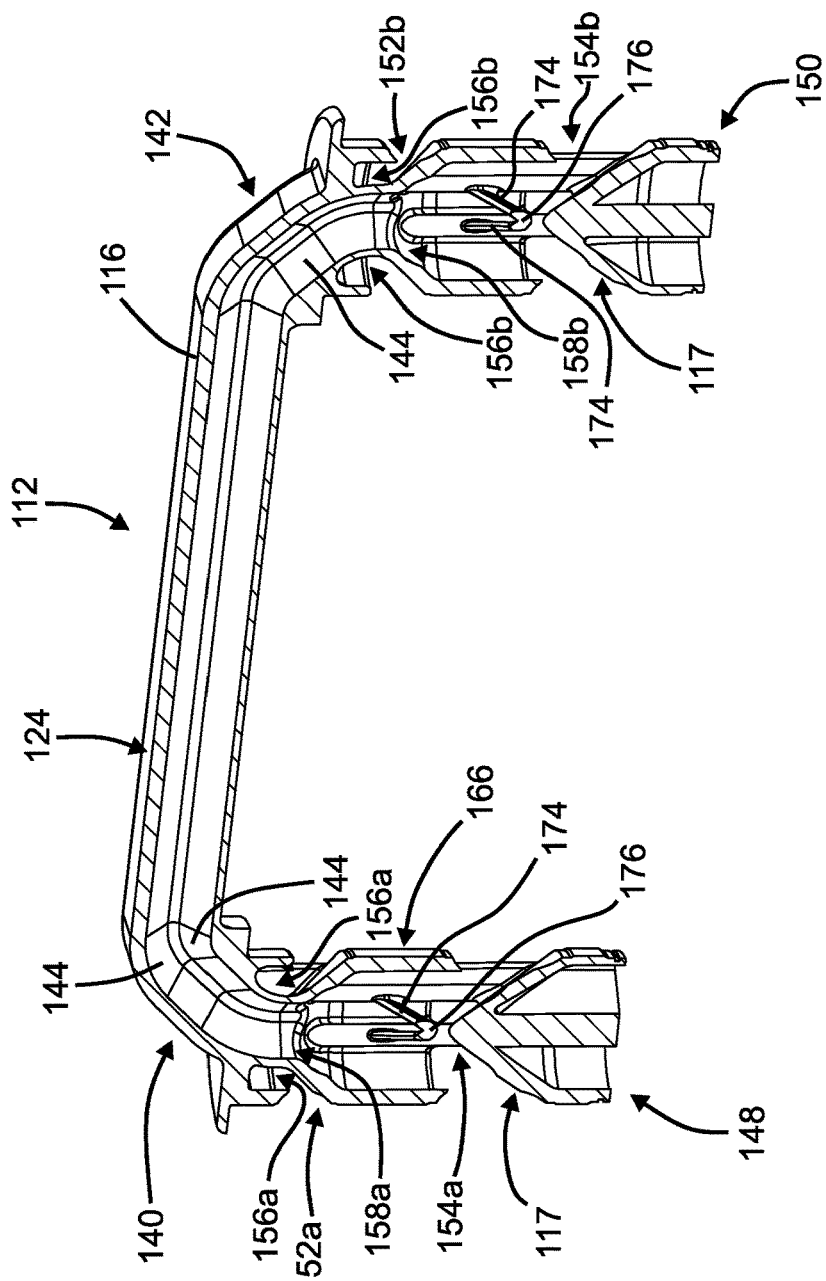
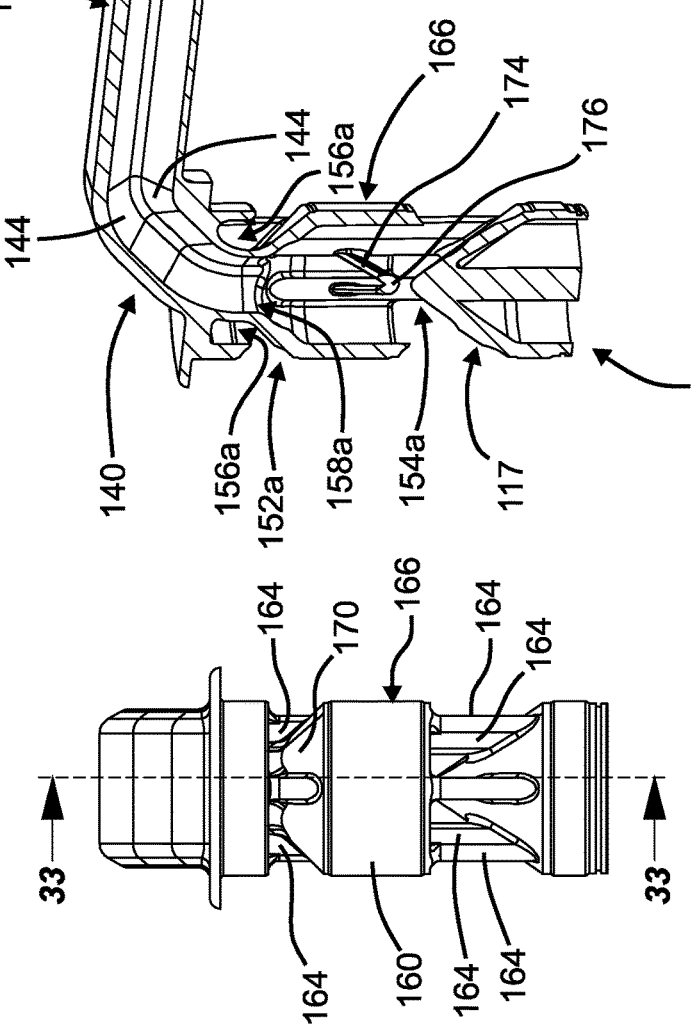

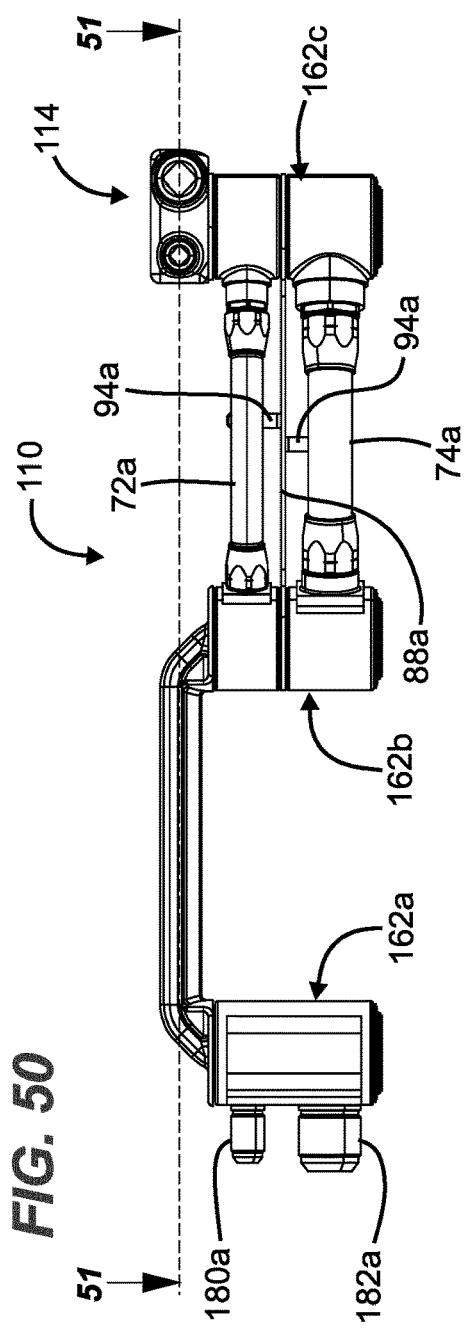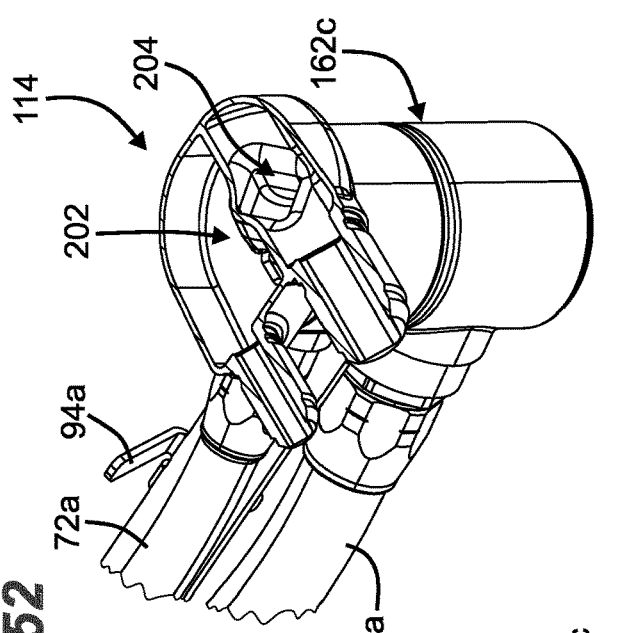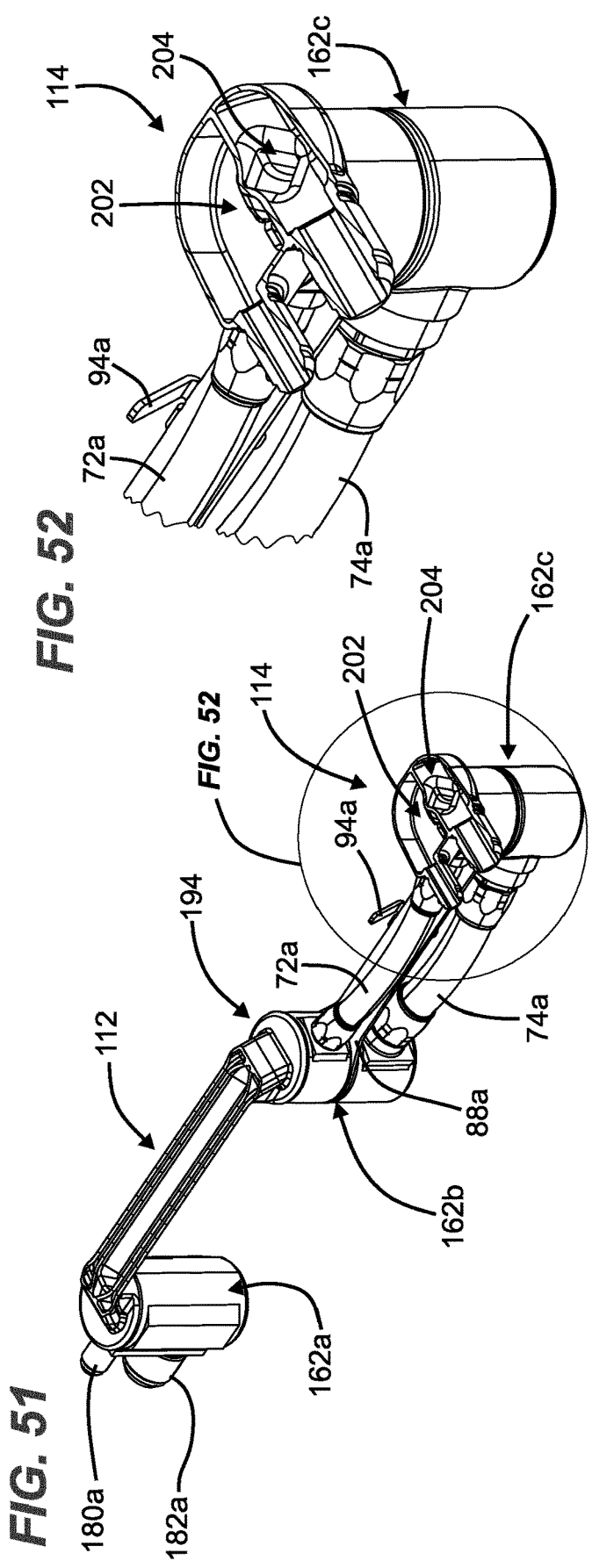
FIG. 50
FIG. 52
FIG. 51

ADDITIVE MANUFACTURED HYDRAULIC SWIVEL BOLT; AND METHOD

CROSS-REFERENCE TO RELATED APPLICATIONS

This application is a national stage of International Application No. PCT/EP2021/025500, filed on Dec. 14, 2021, which claims priority to U.S. Provisional Application No. 63/125,239, filed Dec. 14, 2020 and U.S. Provisional Application No. 63/217,072, filed Jun. 30, 2021, the disclosures of each of which are incorporated herein by reference in their entirety.

TECHNICAL FIELD

The present disclosure relates generally to hydraulic bolts used in a tilt rotor aircraft having a rotating proprotor assembly.

BACKGROUND

Hydraulic swivel or swing joints are adapted to transfer pressure fluids to and from a movable or telescoping mechanism, either as supply and return lines, as for example, to a hydraulic motor or a double acting hydraulic cylinder. Typically, hydraulic swivel bolts are adapted for use with tiltrotor aircrafts but is not limited to use on aircrafts.

Tiltrotor aircrafts generates lift and propulsion by way of at least one pair of powered rotors (sometimes called proprotors) mounted on rotating shafts or nacelles usually at the ends of a fixed wing. Fluids, such as oil, coolant, and hydraulic fluid, can be transferred between a fixed portion of the aircraft and the rotatable proprotors.

Improvements are desired to provide a swivel bolt that can improve high pressure fluid flow performance while minimizing leakage, reducing swivel weight and pressure drop across the swivel bolt.

SUMMARY

The present disclosure relates generally to an additive manufactured hydraulic swivel bolt with a unique geometry with improved flow performance without fluid leakage or failure. The present disclosure also relates to a method for additively manufactured tubular passages of a hydraulic swivel bolt. The additively manufactured hydraulic swivel bolt can have a significant mass weight reduction compared with conventional swivel bolts.

As used herein, the term "additive manufacturing" encompasses any method or process whereby a three-dimensional object is produced by addition of successive layers of a material to produce a manufactured component. Art additive manufacturing process differs significantly from conventional, erosive manufacturing methods. As used herein, the term "additive manufacturing" should not be construed to encompass fabrication or joining of previously formed objects. Instead of milling a work piece from a solid block, the components of an additive manufacturing are present as a starting material of fine powder and are built layer by layer. A variety of additive manufacturing technologies are commercially available, for example, 3D printing, which is often also understood to mean laser sintering or laser melting.

These technologies may use a variety of materials as substrates for an additive manufacturing process, including various plastics and polymers, metals and metal alloys, ceramic materials, metal clays, organic materials, and the like. The powdery material can include a metal powder, such as nickel, iron, cobalt, stainless steel, an alloy of these metals, or a ceramic powder. It will be appreciated that any method of additive manufacturing and associated compatible materials, whether presently available or yet to be developed, are intended to be included within the scope of the present disclosure.

These and other features and advantages will be apparent from a reading of the following detailed description and a review of the associated drawings. It is to be understood that both the foregoing general description and the following detailed description are exemplary and explanatory only and are not restrictive of the broad concepts upon which the embodiments disclosed herein are based.

BRIEF DESCRIPTION OF THE DRAWINGS

The accompanying drawings, which are incorporated in and constitute a part of the description, illustrate several aspects of the present disclosure. A brief description of the drawings is as follows:

FIG. 1 illustrates a side view of an example hydraulic swivel bolt including a U-shaped bolt and a single bolt in accordance with principles of the present disclosure;

FIG. 2 illustrates a cross-sectional perspective view taken along line 2-2 of FIG. 1;

FIG. 3 illustrates another perspective view of the hydraulic swivel bolt of FIG. 2;

FIG. 14 illustrates a cross-sectional view of the hydraulic swivel bolt of FIG. 9;

FIG. 19 illustrates another perspective view of the hydraulic swivel bolt of FIG. 1;

FIG. 20 illustrates a cross-sectional view taken along line 20-20 of FIG. 19;

FIG. 21 illustrates an end view of the hydraulic swivel bolt of FIG. 1;

FIG. 22 illustrates a cross-sectional view taken along line 22-22 of FIG. 21;

FIG. 23 illustrates an enlarged view of a portion of FIG. 22 showing a retaining ring;

FIG. 32 illustrates an end view of the hydraulic swivel bolt of FIG. 27;

FIG. 33 illustrates a cross-sectional view take along line 33-33 of FIG. 32;

FIG. 50 illustrates a side view of the hydraulic swivel bolt of FIG. 27;

FIG. 51 illustrates a cross-sectional view taken along line 51-51 of FIG. 50, and FIG. 52 illustrates an enlarged view of a portion of FIG. 51.

DETAILED DESCRIPTION

Figure 5:
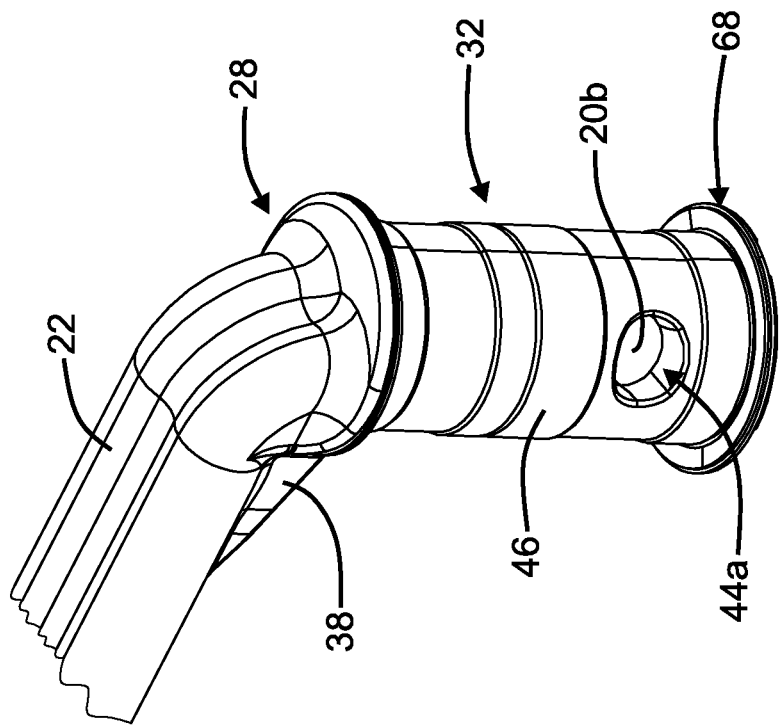
FIG. 5 illustrates another perspective view of the first end of the U-shaped bolt of FIG. 4 showing a second port.

Reference will now be made in detail to the exemplary aspects of the present disclosure that are illustrated in the accompanying drawings. Wherever possible, the same reference numbers will be used throughout the drawings to refer to the same or like structure The additively manufactured swivel bolt has improved features over conventionally manufactured bolts in a complex, multi-passage swivel assembly used for tilt rotor functionality in aircraft. The new bolt has unique geometry achievable by using additively manufacturing. The additively manufactured swivel bolt has a reduced weight of 40% over conventionally manufactured bolts while providing improved flow performance and reduced fluid leak paths.

The present disclosure relates to an additively manufactured hydraulic swivel bolt and a method of fabricating the same. Additive manufacturing significantly enhances the ability to improve fluid flow through the hydraulic swivel bolt and reduces pressure drop across the hydraulic swivel bolt. Such a method offers significant advantages over prior art solutions that eliminate leak paths and failure points. The additive manufacturing techniques provide the ability to design a hydraulic swivel bolt that meets operational requirements, without the manufacturing restrictions that are common with conventional manufacturing processes (i.e., welding, casting, etc.)

The additive manufacturing technique can produce complex objects by constructing objects, typically in the vertical, (Y) direction, point by point, layer by layer. Additive manufacturing techniques can be used to fabricate features on and within a hydraulic swivel bolt in accordance with the present disclosure to enhance its operational capabilities.

Those skilled in the art will appreciate that the methods and structures disclosed herein can be implemented by any additive manufacturing technique or technique. For example, layer additive processing, layer subtractive processing, or hybrid processing.

FIGS. 1-3 depict an example additively manufactured hydraulic swivel bolt 10 in accordance with the principles of the present disclosure. The hydraulic swivel bolt 10 can be used for tiltrotor functionality in aircrafts, although alternatives are possible.

The hydraulic swivel bolt 10 may include a U-shaped bolt 12 and a single bolt 14. Hoses 16 (e.g., connection member, connecting arrangement) can be added to provide a fluid connection between the U-shaped bolt 12 and the single bolt 14. That is, the hoses 16 can be configured as fluid conveying reinforced flexible tubes. In certain examples, the hoses 16 can be a flexible tube, such as Nylon or PTFE tubing, with a covering layer, such as braided stainless steel or some other appropriate protective type material such as Kevlar®. It will be appreciated, however, that hoses 16 may include any fluid conveying conduit having a reinforced flexible tube in which the covering layer may be separated from the flexible tube.

The U-shaped bolt 12 can be a unitary, monolithic body comprised of a single material or alloy with several integral structures. The single bolt 14 may also be a unitary, monolithic body. In certain examples, the U-shaped bolt 12 and the single bolt 14 can be made from a titanium material, although alternatives are possible. In certain examples, the U-shaped bolt 12 and the single bolt 14 can be comprised of a metallic material such as, but not limited to, copper, stainless steel, or high nickel alloy, although alternatives are possible. In certain examples, the U-shaped bolt 12 and the single bolt 14 may be comprised of composite materials that include carbon, such as graphite.

The U-shaped bolt 12 can include a main body 22 that defines a first fluid passage 24 and a separate, second fluid passage 26 that is parallel to the first fluid passage 24. A divider wall 18 providing separation between the first and second fluid passages 24, 26 such that the first and second fluid passages 24, 26 are independent flow paths.

Figure 15:
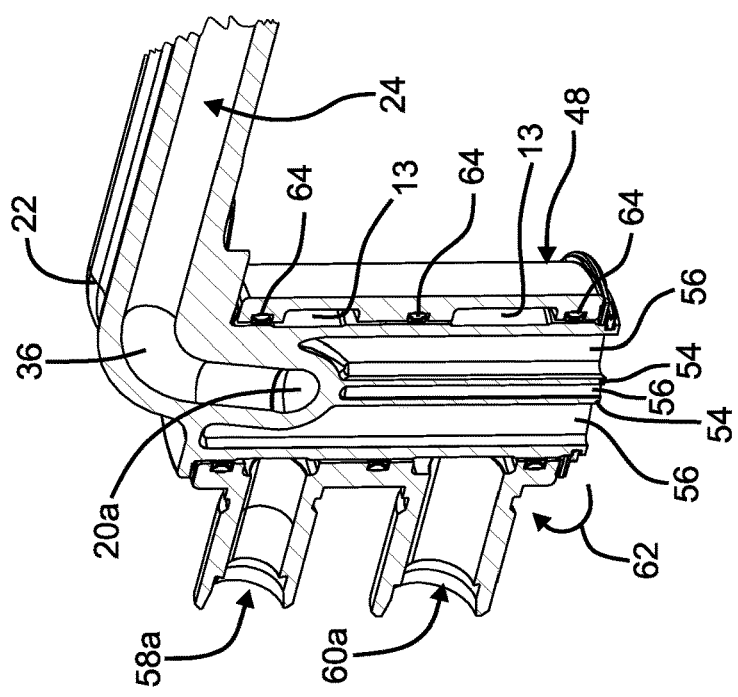
FIG. 15 illustrates an enlarged view of a portion of FIG. 14.
Figure 17:
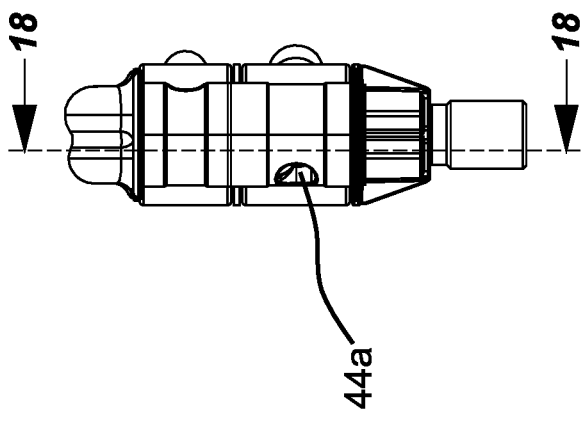
FIG. 17 illustrates an end view of the hydraulic swivel bolt of FIG. 1.
Figure 18:
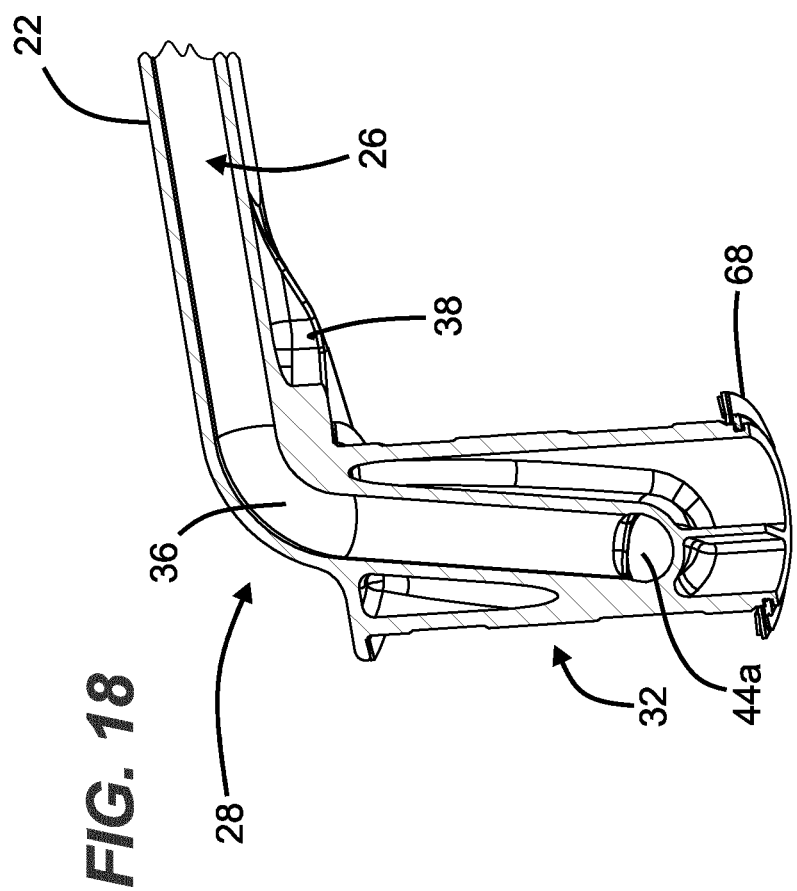
FIG. 18 illustrates a cross-sectional view taken along line 18-18 of FIG. 17.

The first and second fluid passages 24, 26 can extend between opposite first and second ends 28, 30 of the main body 22 of the U-shaped bolt 12. The first and second passages 24, 26 can include transitional curved sections 36 (see FIG. 15) that have smooth, curved (e.g., bend) profiles at the first and second ends 28, 30 of the main body 22 of the U-shaped bolt 12 to enhance flow performance.

Turning to FIGS. 4-7, the U-shaped bolt 12 includes a first shaft 32 formed at the first end 28 of the main body 22 and a second shaft 34 formed at the second end 30 of the main body 22. The first and second shafts 32, 34 are integrally formed as one unitary, monolithic body with the transitional curved sections 36 and the main body 22 of the U-shaped bolt 12. The first and second shafts 32, 34 can have identical configurations.

Conventional U-shaped bolts can be manufactured by drilling or cutting ninety-degree fluid passages in solid metallic material. That is, conventional U-shaped bolts have substantially right-angled passages relative to a main body axis X (see FIG. 2). Conventional U-shaped bolts also include leak plugs to plug the drilled passages. Leak plugs in a hydraulic system can have flaws due to high pressure in the system which may cause leakage that can lead to performance issues.

Unlike conventional swivel bolts, the additively manufactured U-shaped bolt 12 does not include ninety-degree intersecting, mechanically drilled passages with leak plugs. The transitional curved sections 36 of the additive manufactured U-shaped bolt 12 allows for smooth flow transition through the first and second fluid passages 24, 26 of the main body 22. The transitional curved sections 36 are configured to eliminate leakage and failure points by providing a smooth transition of non-turbulent fluid flow through the first and second passages 24, 26, respectively. That is, the U-shaped bolt 12 is free of sharp corners and leak plugs which improves flow performance and also reduces pressure drop across the U-shaped bolt 12. In certain examples, the U-shaped bolt 12 can have a pressure drop between about 4 psi to about 5 psi.

Another advantageous feature of the additively manufactured U-shaped bolt 12 is its mass weight reduction compared to conventionally swivel bolts. That is, fabrication of the U-shaped bolt 12 using additive manufacturing can accommodate forces, temperatures and other requirements needed for performance while reducing the overall mass weight. During the additive manufacturing process, the three-dimensional printing process can add metallic material only where needed to meet all structural requirements while eliminating material in other areas to form a lighter swivel bolt.

In certain examples, the conventional U-shaped bolt can have a mass weight between about 5 pounds (lbs.) to about 6 pounds, while a U-shaped bolt made by additive manufacturing can have a mass weight between about 2 pounds to about 3 pounds. In certain examples, the additive manufacturing process reduces the overall weight of the U-shaped bolt 12 to less than 3 pounds, although alternatives are possible. In certain examples, additively manufactured U-shaped bolt can reduce the overall mass weight between about 30% to about 50% compared to conventionally made U-shaped bolts.

Figure 8:
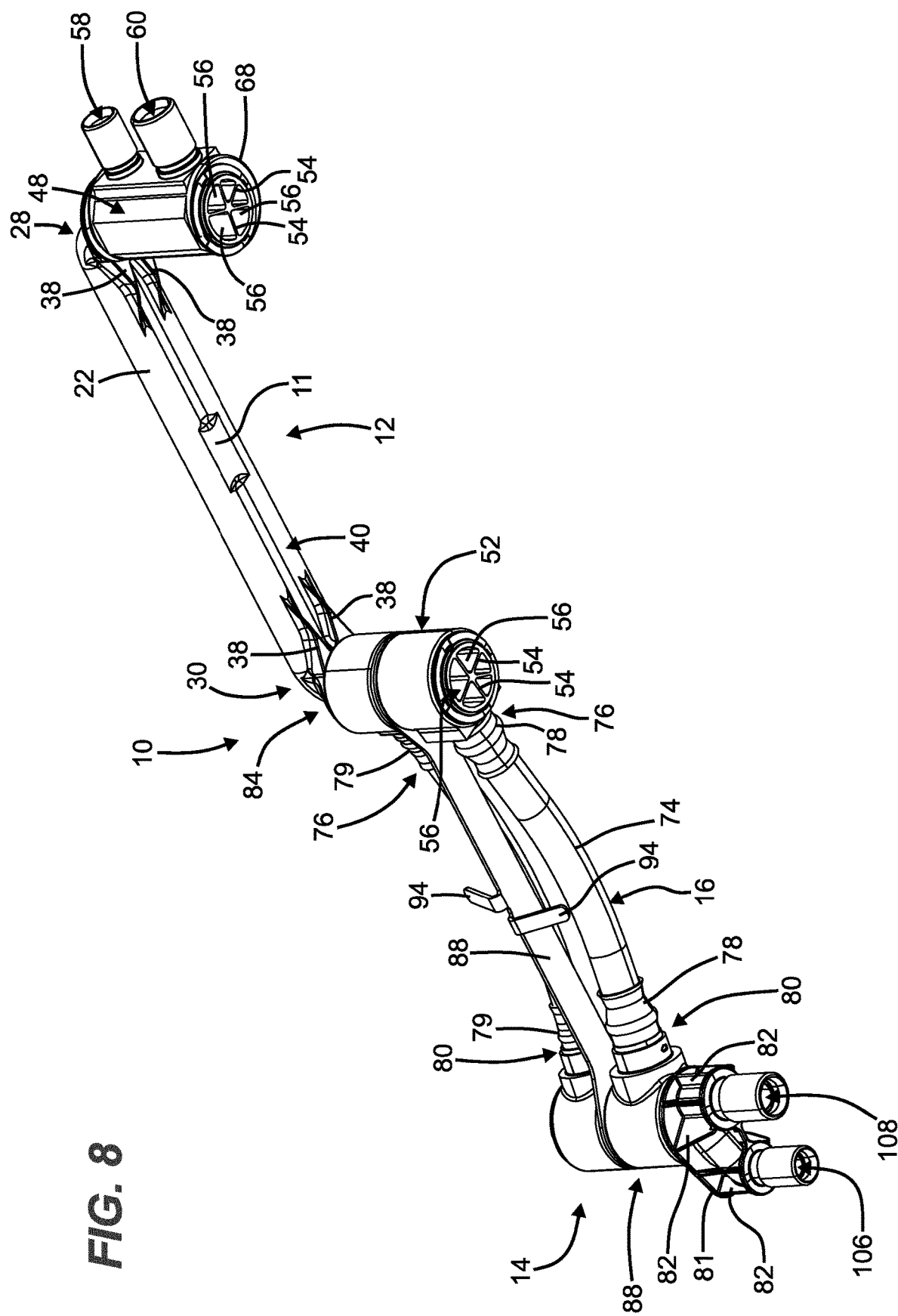
FIG. 8 illustrates a bottom perspective view of the hydraulic swivel bolt of FIG. 1.
Figure 9:
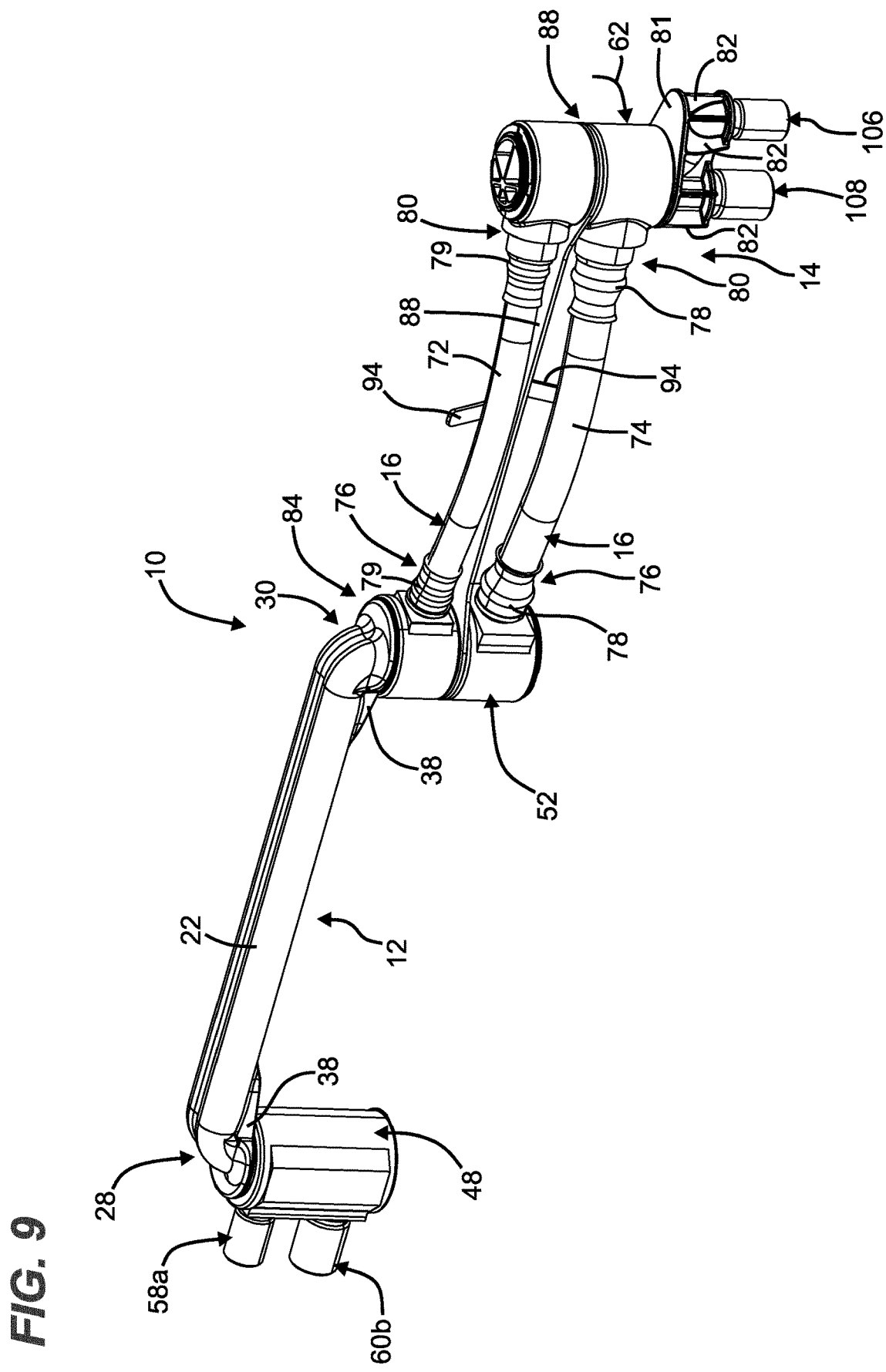
FIG. 9 illustrates another perspective view of the hydraulic swivel bolt of FIG. 8.
Figure 10:
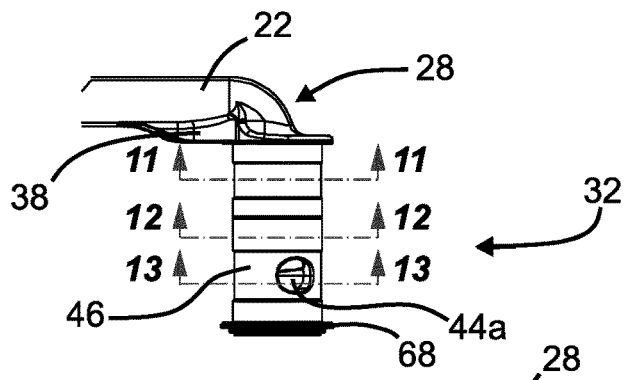
FIGS. 10-13 illustrate perspective views of the first shaft of the U-shaped bolt showing variable wall thicknesses within the first shaft.
Figure 11:
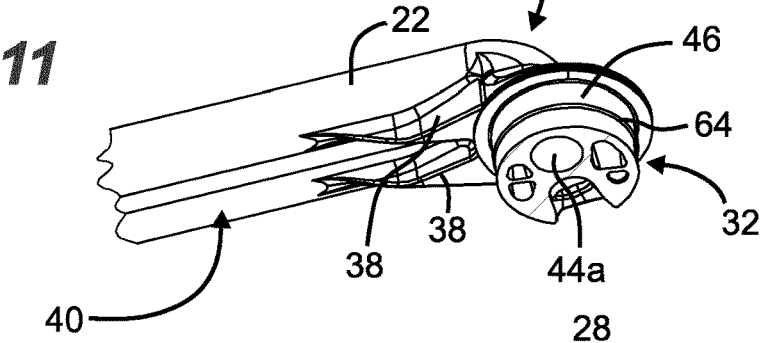
Figure 12:
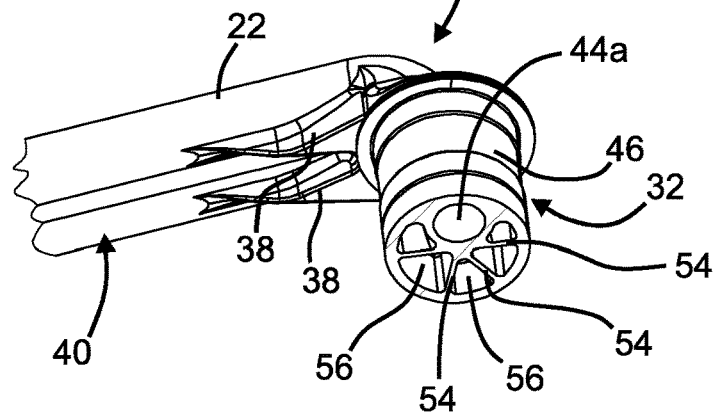
Figure 13:
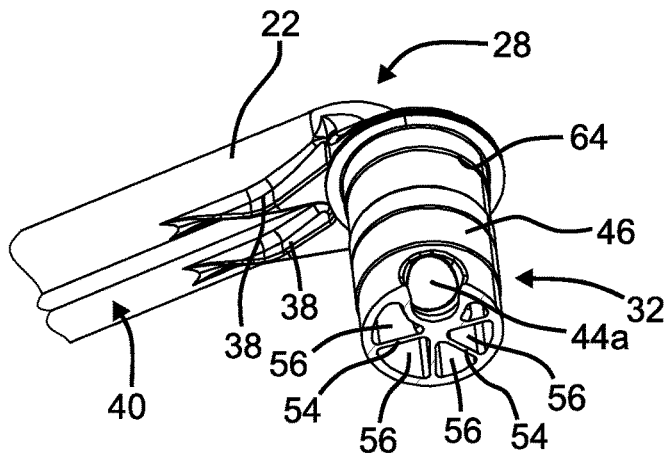
Figure 16:
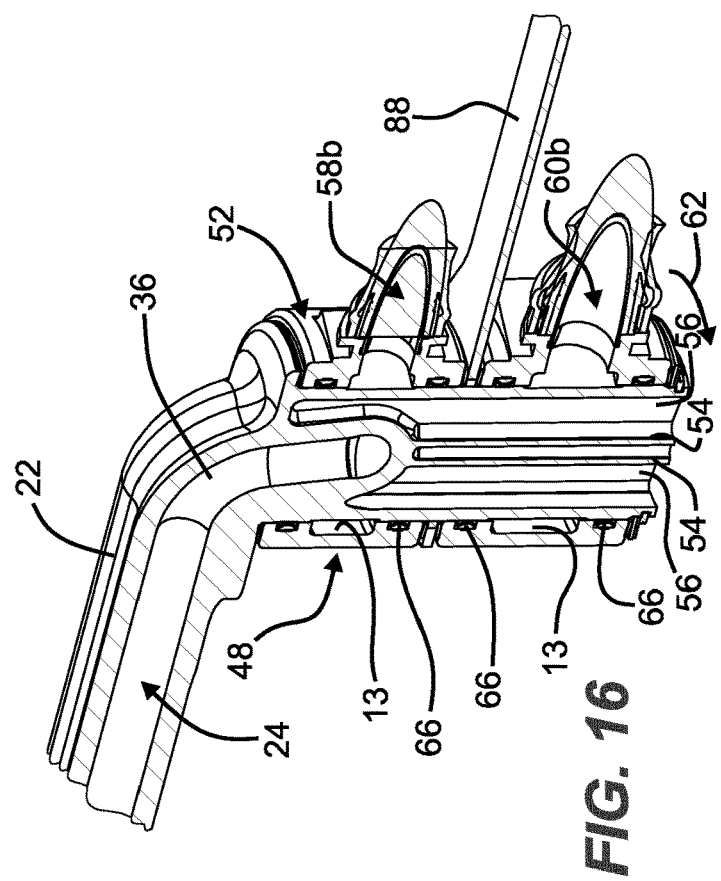
FIG. 16 illustrates an enlarged view of a portion of FIG. 14.

Turning again to FIGS. 4-7, the U-shaped bolt 12 can include reinforced ribs 38 along an underside 40 (e.g., bottom side) of the main body 22 at the first and second ends 28, 30 thereof to improve torsional and compressive strength. The reinforced ribs 38 are configured to provide torsional stiffness to the U-shaped bolt 12 in order to resist twisting. In certain examples, the underside 40 of the main body 22 may include an embossed region 11 (see FIG. 8) for embossing a part identification number during the additive printing process.

The first and second shafts 32, 34 of the U-shaped bolt 12 can each define a first orifice 42a, 42b (e.g., a first port) that are in fluid communication with the first fluid 2 passage 24 and a second orifice 44a, 44b (e.g., a second port) that is in fluid communication with the second fluid passage 26. The first and second orifices 42a, 42b, 44s, 44b can be axially separated from one another (i.e., separated from one another along the axis of their respective shaft). The first orifices 42a, 42b each include a passage 20a through the respective shafts 32, 34 that connects to the first fluid passage 23 and the second orifices 44a, 44b each include a passage 20b through the respective shafts 32, 34 that connects to the second fluid passage 26.

The first and second fluid passages 24, 26 can function respectively as supply and return lines for some operating device or system connected to the first and second fluid passages 24, 26. That is, high pressure fluid from the operating device can enter the first orifice 42a of the first shaft 32 to flow through the first fluid passage 24 and through the first orifice 42b of the second shaft 34. In certain examples, the first fluid passage 24 can deliver 3000 psi of hydraulic fluid. In certain examples, the first fluid passage 24 can deliver at least 3000 psi of hydraulic fluid, although alternatives are possible. The hydraulic fluid can return through the second orifice 44b of the second shaft 34 to flow through the second fluid passage 26 and through the second orifice 44a of the first shaft 32 to deliver 100 psi of hydraulic fluid back to a hydraulic reservoir in the system. In certain examples, the second fluid passage 26 can deliver 100 psi or less of hydraulic fluid back to the reservoir in the system.

The first fluid passage 24 can serve as the high-pressure side of a pump/motor and the second fluid passage 26 can serve as the low-pressure side of the pump/motor. It is to be noted that the first and second fluid passages 24, 26 are maintained separate and independent, so that the separate first and second fluid passages 24, 26 may be used for either supply or return lines of a hydraulic circuit.

Figure 4:
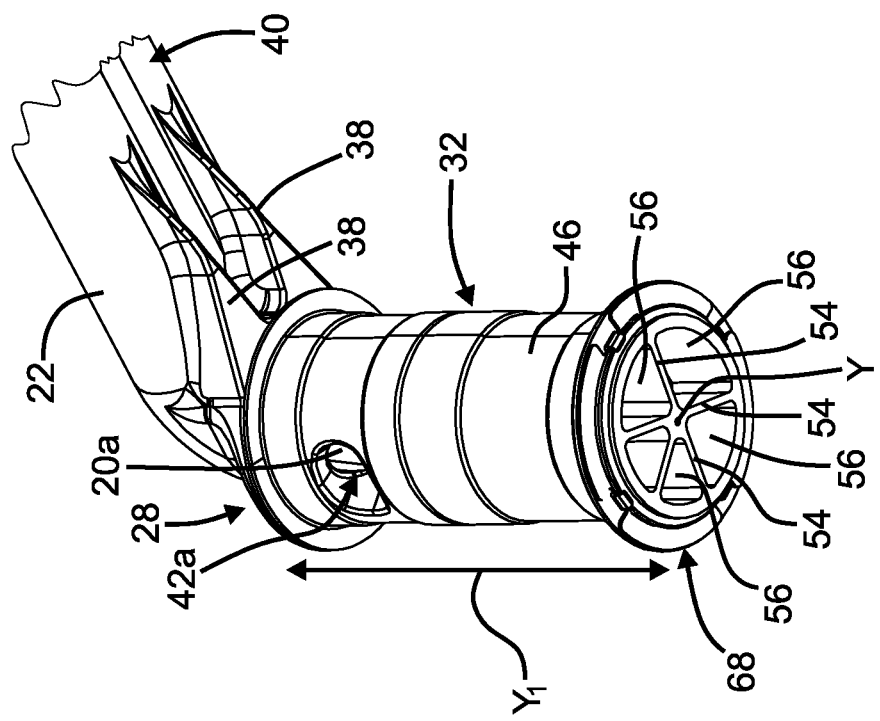
FIG. 4 illustrates a bottom perspective view of a first end of the U-shaped bolt showing a first shaft with a first port.

Referring to FIGS. 4-5, the first shaft 32 includes a first sealing surface 46 (e.g., bearing surface) that receives a first tubular sleeve 48 (e.g., first fluid flow component interface, first connector housing) and the second shaft 34 includes a second sealing surface 50 (see FIG. 6) that receives a second tubular sleeve 52 (e.g., second fluid flow component interface, second connector housing). The additively manufactured first and second shafts 32, 34 can be formed as hollow tubes with the minimal amount of material required to prevent the first and second shafts 32, 34 from breaking or rupturing.

The first and second shafts 32, 34 may include a plurality of radial walls 54 that extend radially from a central region at a central axis Y of the shaft to an outer circumferential wall of the shaft and that extend along the length of the shaft so as to divide the interior of the shaft into a plurality of axial passages 56 positioned circumferentially about the central axis Y of the shaft relative to one another. The axial passages 56 extend longitudinally along the first and second shafts 32, 34. The axial passages 56 are closed ended openings that do not have any fluid communication with the first and second fluid passages 24, 26. The axial passages 56 are provided to reduce overall weight of the first and second shafts 32, 34 of the U-shaped bolt 12. As seen best in FIGS. 4 and 7, live spaced walls 54 can be positioned around the circumference of the first and second shafts 32, 34, parallel to a longitudinal axis $Y_1$ of the first and second shafts 32, 34.

FIGS. 10-13 depict the walls 54 of the first and second shafts 32, 34 with a variable thickness along the longitudinal axis Y. The walls 52 of the first and second shafts 32, 34 of the U-shaped bolt 12 can form an internal wall profile configured to improve flow performance while reducing the overall mass weight of the swivel bolt 10. In certain examples, the plurality of axial passages 56 may have the same size in the first and second shafts 32, 34. In certain examples, the plurality of axial passages 56 may not all be sized equally.

Referring to FIGS. 14-22, when the first and second tubular sleeves 48, 52 are supported on the first and second shafts 32, 34, respectively, the first and second sealing surfaces 46, 50 of the first and second shafts 32, 34 provide annular fluid areas or chambers 13 therebetween.

The first and second tubular sleeves 48, 52 can be made with identical configurations. In certain examples, the first and second tubular sleeves 48, 52 can each include input and output ports 58a, 58b, 60a, 60b for connecting to another system configured to be in fluid communication with the first and second fluid passages 24, 26 of the U-shaped bolt 12.

Hydraulic fluid can fill the annular fluid chambers 13 between the first and second shafts 32, 34 and the first and second tubular sleeves 48, 52. The U-shaped bolt 12 is configured to allow fluid communication between the input and output ports 58a, 58b, 60a, 60b of the first and second tubular sleeves 48, 52, the first and second orifices 42a, 42b, 44a, 44b of the first and second shafts 32, 34, and the first and second fluid passages 24, 26 of the main body 22. During operation, the first and second tubular sleeves 48, 52 can rotate or pivot about a rotational axis 62 such that hydraulic fluid can flow through the first and second orifices 42a, 42b, 44a, 44b and the first and second passages 23, 26 irrespective of where the input and output ports 58a, 58b, 60a, 60b are positioned relative to the first and second orifices 42a, 42b, 44a, 44b. The first and second tubular sleeves 48, 52 can rotate or swivel about the rotational axis 62 such that the first and second orifices 42a, 42b, 44a, 44b of the first and second shafts 32, 34 may not be aligned with the input and output ports 58a, 58b, 60a, 60b of the first and second tubular sleeves 48, 52. That is, fluid can still flow around the first and second shafts 32, 34 and through the first and second orifices 42a, 42b, 44a, 44b regardless of how the first and second tubular sleeves 48, 52 turn.

Figure 6:
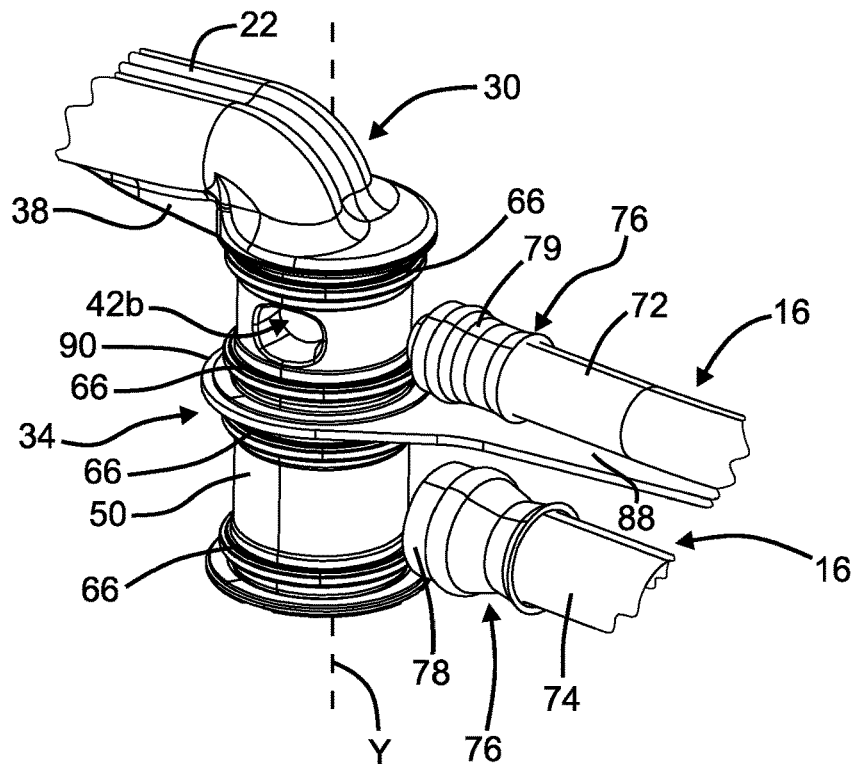
FIG. 6 illustrates a perspective view of a second end of the U-shaped bolt showing a second shaft with a first port.
Figure 7:
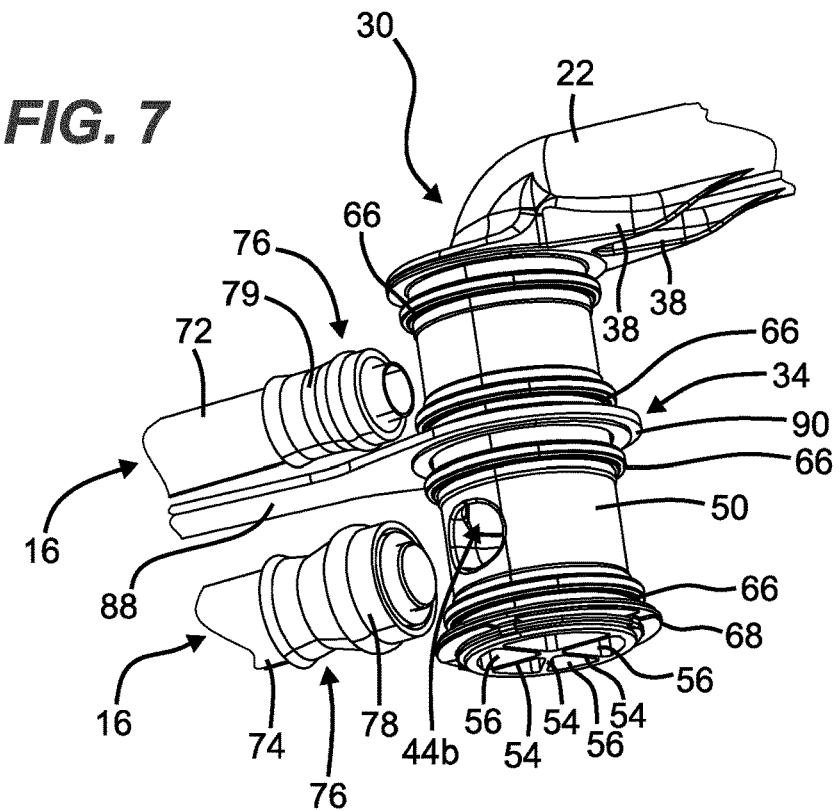
FIG. 7 illustrates another perspective view of the second end of the U-shaped bolt of FIG. 6 showing a second port.

The first and second sealing surfaces 46, 50 of the first and second shafts 32, 34 can define recesses 64 provided at spaced points circumferentially thereabout for receiving seals 66 (see FIG. 6). The seals 66 can be preinstalled in the recesses 64.

Turning again to FIGS. 4-5, and 23, a snap ring (e.g., retainer ring) 68 can be provided to keep the first and second tubular sleeves 48, 52 attached to the first and second shafts 32, 34, respectively, thereby preventing the first and second tubular sleeves 48, 52 from sliding off. A dust seal 70 can be provided to prevent dust from getting into the U-shaped bolt 12.

Turning to again to FIGS. 6-9, the input and output ports 58b, 60b of the second tubular sleeve 52 can be attached to respective, first and second flexible hydraulic hoses 72, 74 at a first end 76 thereof via hose fittings 78, 79. Hose fittings 78, 79 can also be attached to opposite, second ends 80 of the first and second flexible hydraulic hoses 72, 74 for connecting to the single bolt 14. Similarly, to the U-shaped bolt 12, the single bolt 14 is made via additive manufacturing and has similar properties. The internal structure of the single bolt 14 is configured to improve flow performance and reduce pressure drop.

Figure 25:
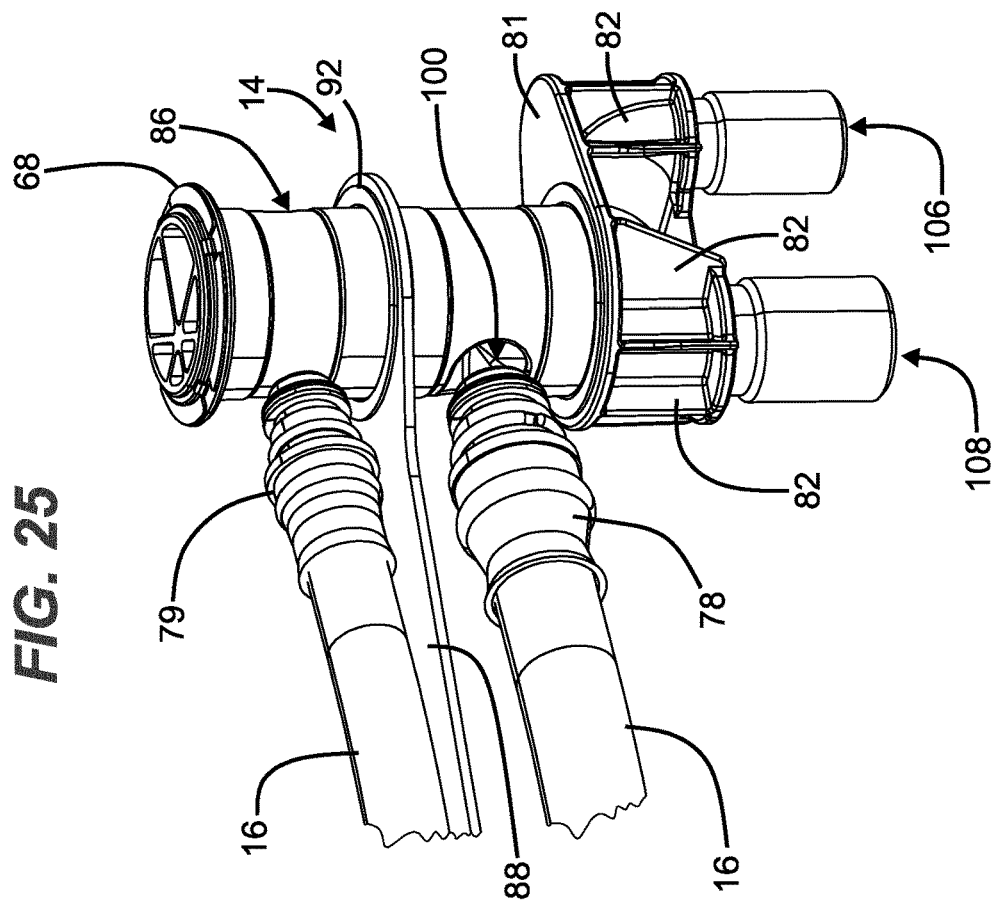
FIG. 25 illustrates another perspective view of the single bolt of FIG. 24.
Figure 24:
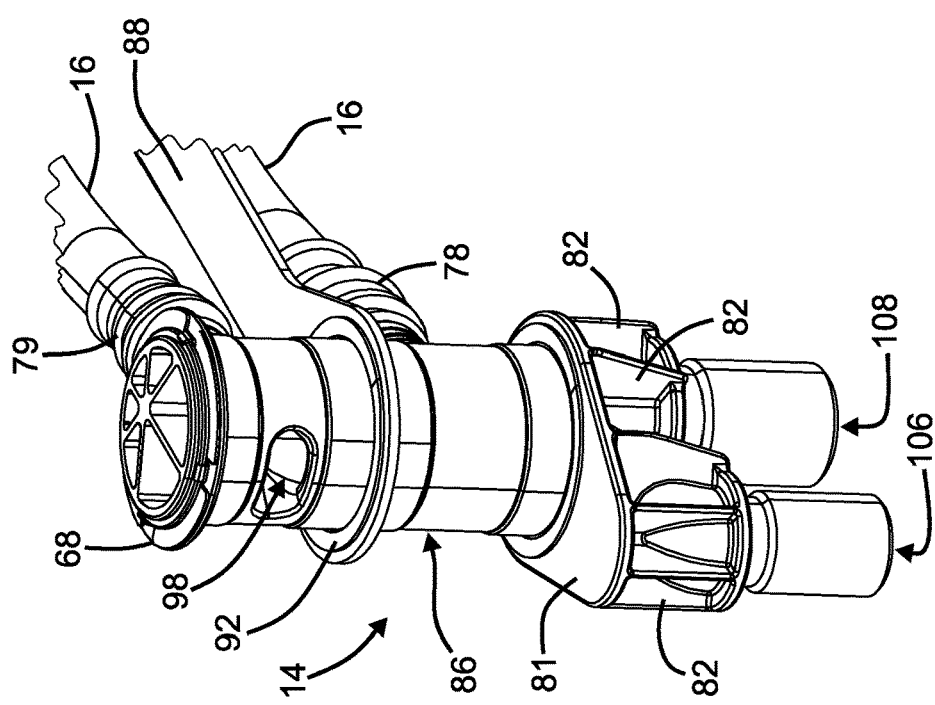
FIG. 24 illustrates a perspective view of the single bolt of FIG. 1.
Figure 26:
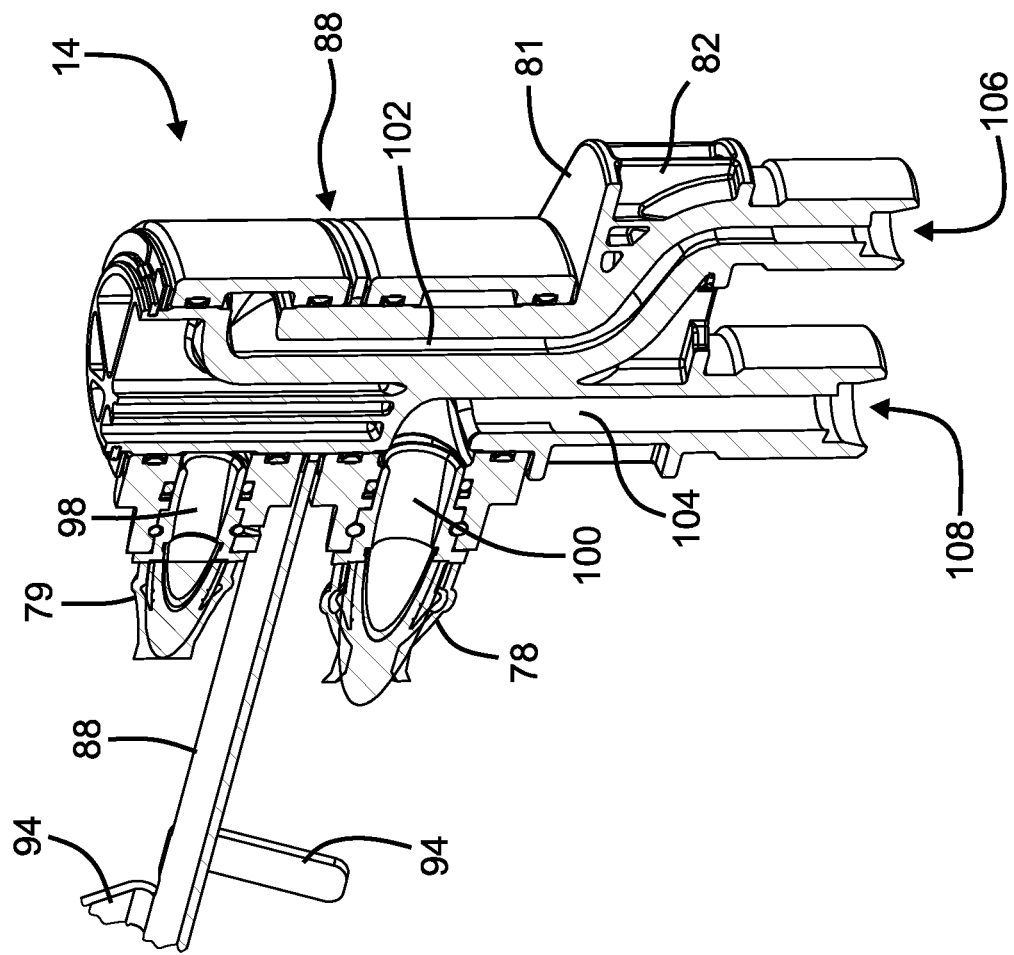
FIG. 26 illustrates an enlarged view of a portion of FIG. 14.

Referring to FIGS. 24-26, illustrations of the single bolt 14 is depicted. The U-shaped bolt 12 and the single bolt 14 are adapted to pivot or rotate relative to one another at swivel joint location 84 (see FIG. 9). The single bolt 14 includes a single bolt shaft 86 that has a configuration similar to the first and second shafts 32, 34 of the U-shaped bolt 12. As described above with reference to the U-shaped bolt 12, a single bolt tubular sleeve 88 can be mounted over the single bolt shaft 86 and retained thereon with the snap ring 68. The single bolt tubular sleeve 88 can have similar features to those described above with reference to the first and second tubular sleeves 48, 52. The single bolt tubular sleeve 88 can rotate and pivot about rotational axis 62.

The single bolt tubular sleeve 88 can include a fluid flow component interface that has a fluid flow component interface inlet (e.g., input port) 98 and a fluid flow component interface outlet (e.g., output port) 100. The single blot 14 can include a first passageway 102 fluidically configured to connect with the fluid flow component interface inlet 98 of that flow path, and a second passageway 104 fluidically configured to connect with the fluid flow component interface outlet 100 of that flow path. The first and second passageways 102, 104 of the single bolt 14 have separate, independent pathways.

Turning again to FIG. 14, in certain examples, the swivel bolt 10 can include an elongated metal band 88 (e.g., elongated bracket) that has a first closed-end 90 (see FIG. 6) adapted to mount over the second tubular sleeve 52 and a second closed-end 92 (see FIG. 24) that mounts over the single bolt sleeve 86. The elongated metal band 88 can provide a pivotal attachment between the second tubular sleeve 52 of the U-shaped bolt 12 and the single bolt tubular sleeve 88 of the single bolt 14. The elongated metal band 88 includes tabs 94 designed to help prevent the first and second flexible hydraulic hoses 72, 74 from twisting or flipping over one other. The elongated metal band 88 can help to prevent rotation of the first and second flexible hydraulic hoses 72, 74 about a longitudinal axis 96 of the elongated metal band 88.

The hose fittings 78, 79 at the second ends 80 of the first and second flexible hydraulic hoses 72, 74 can be attached to radial input and output ports 98, 100 of the single bolt sleeve 88. The flirt and second passageways 102, 104 can be uniquely formed in the single bolt 14 via additive manufacturing to include the advantageous features described above with respect to the U-shaped bolt 12 but with a different geometry.

The additive manufacturing process reduces the overall weight of the single bolt 14 compared to conventional single bolts. In certain examples, a conventional single bolt can have a mass weight between about 2 lbs. to about 3 lbs., while the additive manufactured single bolt 14 can have a mass weight between about 1 lbs to about 2 lbs. In certain examples, the single bolt 14 can have a mass weight of about 1.7 lbs, although alternatives are possible. In certain examples, additively manufactured single bolt 14 has 30% to about 50% less weight compared to conventionally made single bolts.

The single bolt 14 also includes axial inlet and outlet ports 106, 108 that extend from a body 81 with reinforced ribs 82. The inlet and outlet ports 106, 108 communicate with the first and second passageways 102, 104 and the radial input and output ports 98, 100 of the single bolt 14 respectively. The axial inlet and outlet ports 106, 108, the first and second passageways 102, 104 and the radial input and output pons 98, 100 of the single bolt 14 have a unitary construction.

The inlet and outlet ports 106, 108 can provide fluid connection with another fluid system. During operation, hydraulic fluid from the U-shaped bolt 12 can flow into the radial input port 98 of the single bolt 14 through the first passageway 102 and exit through the axial outlet port 108 at the high-pressure side. Hydraulic fluid can return through the axial inlet port 106, the second passageway 104 and exit the radial output port 100 of the single bolt 14 at the low-pressure side. The first and second flexible hydraulic hoses 72, 74 are configured to allow high-pressure fluid and low-pressure fluid to pass between the single bolt 14 and the U-shaped bolt 12.

Figure 27:
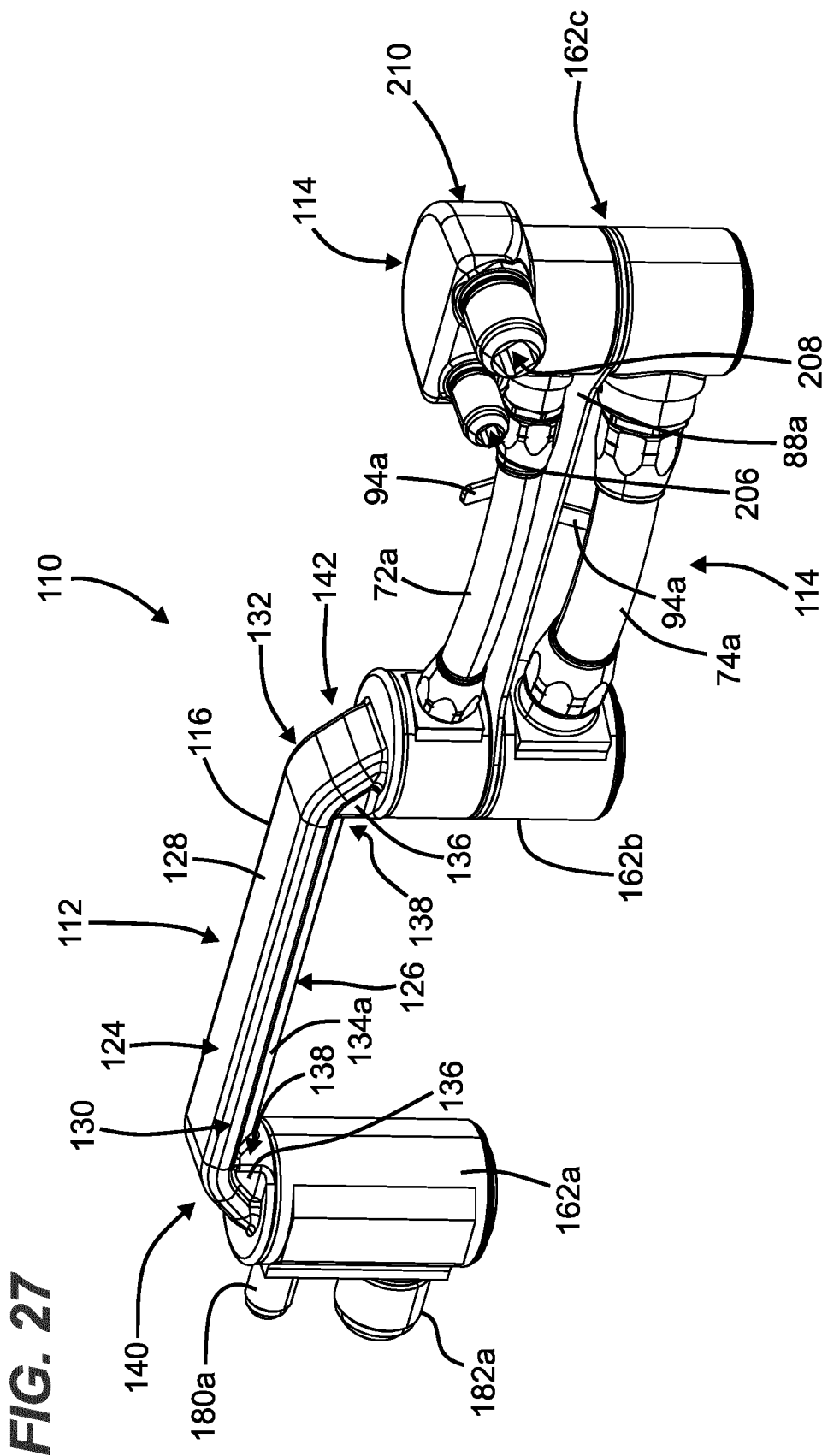
FIG. 27 illustrates a perspective view of another hydraulic swivel bolt including a U-shaped bolt and a single bolt in accordance with principles of the present disclosure.
Figure 28:
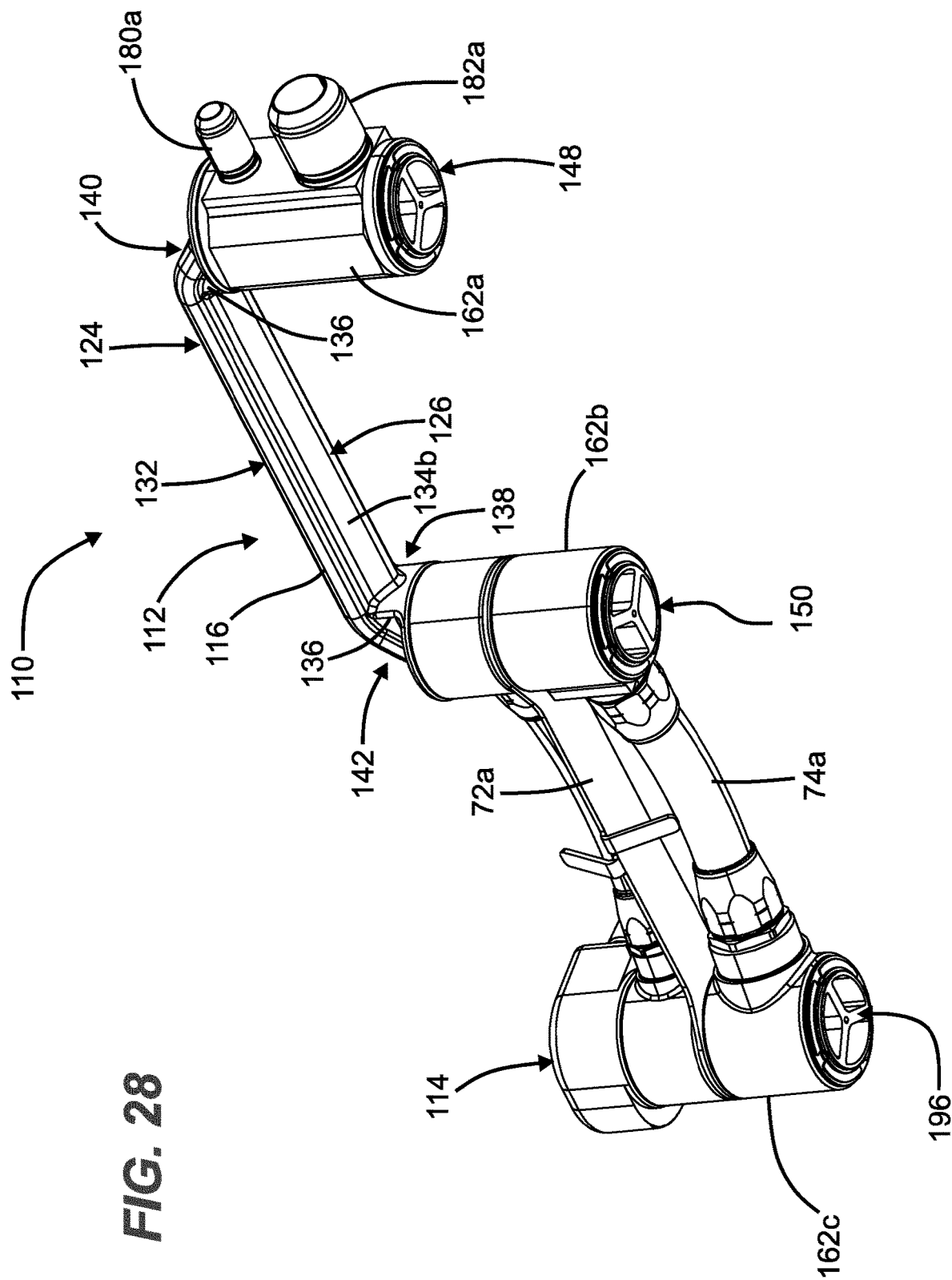
FIG. 28 illustrates a bottom perspective view of the swivel bolt of FIG. 27.
Figure 29:
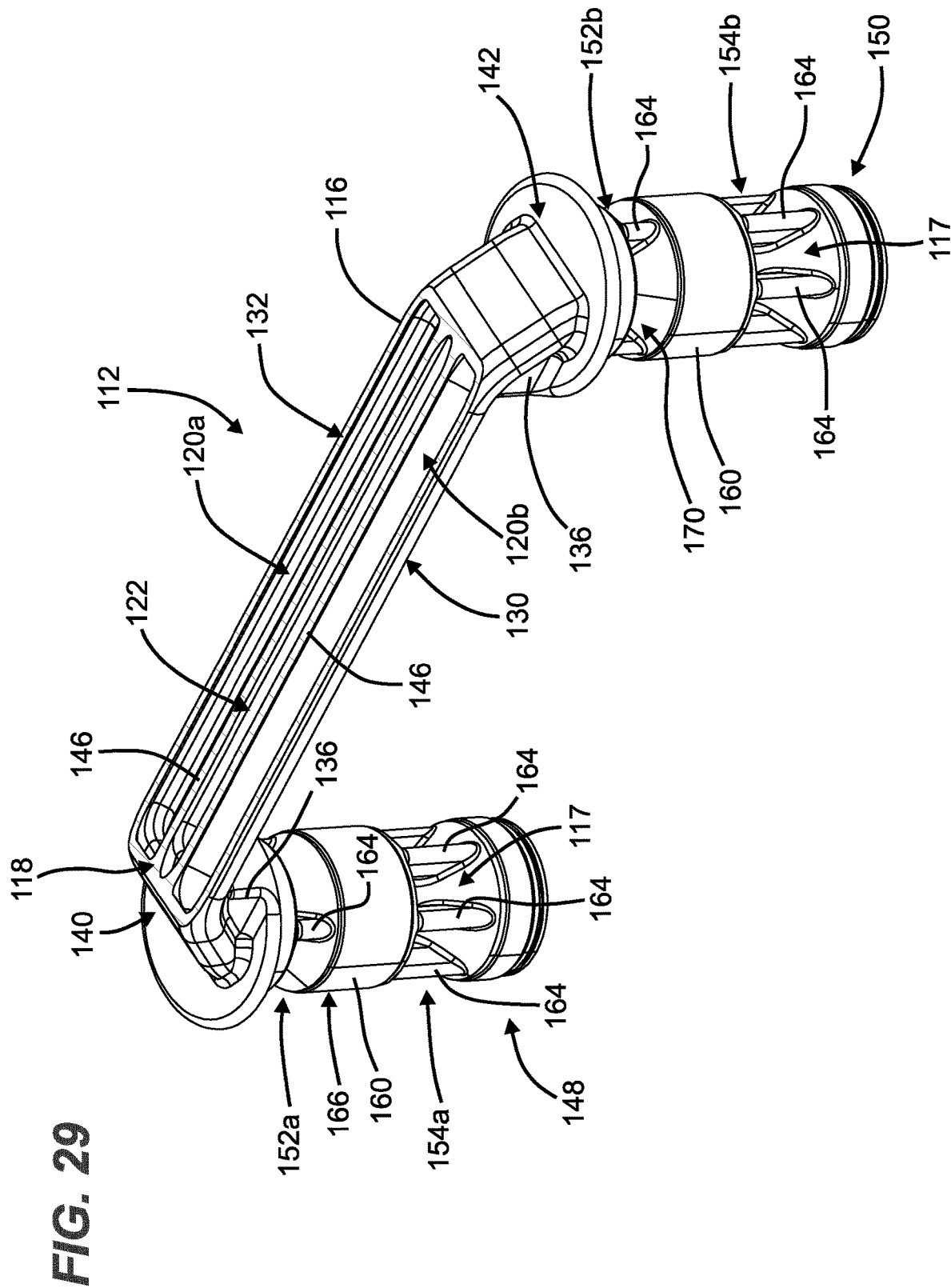
FIG. 29 illustrates a partial cross-sectional view of the U-shaped bolt of FIG. 27.
Figure 30:
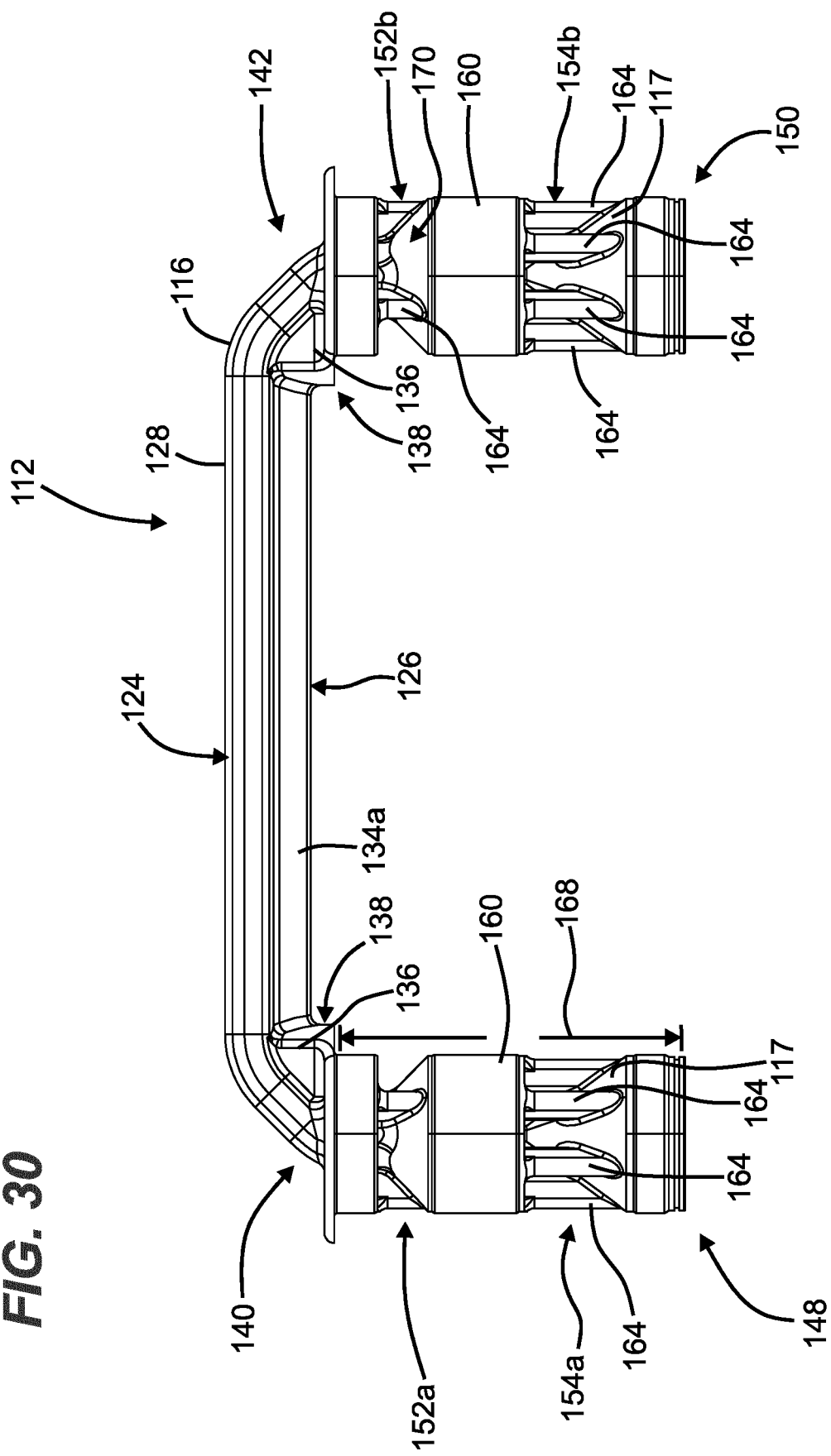
FIG. 30 illustrates a side view of the U-shaped bolt of FIG. 29.
Figure 31:
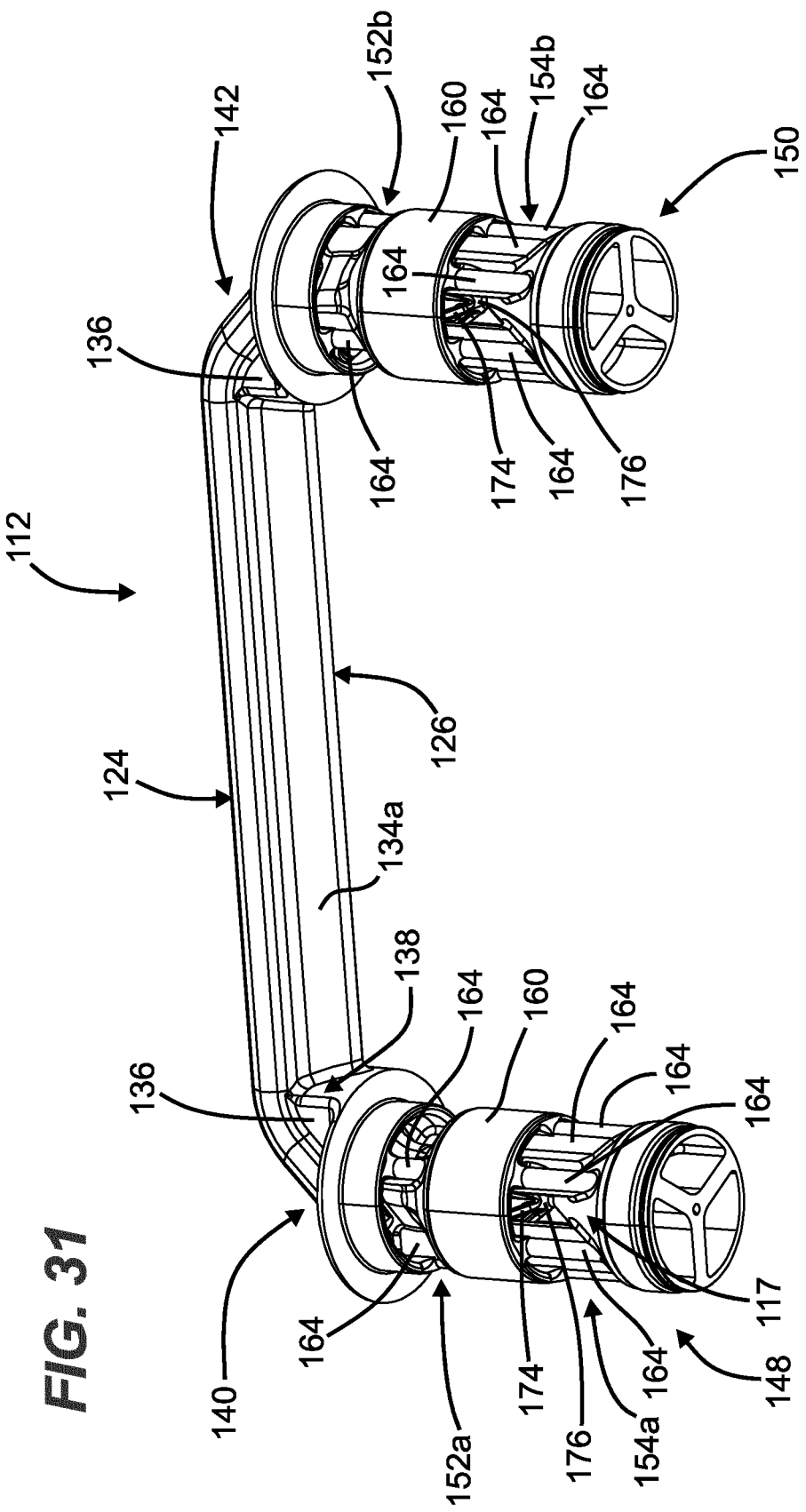
FIG. 31 illustrates a bottom perspective view of the U-shaped bolt of FIG. 30.

FIGS. 27-29 depict another example additively manufactured swivel bolt 110 in accordance with the principles of the present disclosure. The swivel bolt 110 may be an oil swivel. The swivel bolt 110 can be used for tiltrotor functionality in aircrafts, although alternatives are possible. The swivel bolt 110 can be made by a direct metal laser melting (DMLM) process that involves the full melting of metal powder into liquid pools. It will be appreciated that the swivel bolt 110 may also be made by an electron beam melting (EBM) process.

For the DMLM process, an .STL file can be generated from computer-aided design (CAD) data, which guides the "printing" of sequential, micro-thin layers of fully melted metal powders. Various metals can be used, including titanium, cobalt-chrome and aluminum alloys. When printing is complete, excess powder can be easily removed, leaving a high-resolution object with a smooth surface that usually requires little or no post-processing. The DMLM process can be used to form the swivel bolt 110 with a unique geometry and a reduced weight of about 3% to about 50% less weight compared to conventionally manufactured bolts while providing reduced pressure drop across the swivel bolt 110, improved flow performance and reduced fluid leak paths.

The swivel bolt 110 may include a U-shaped bolt 112 and a single bolt 114. The U-shaped bolt 112 can be a unitary, monolithic body comprised of a single material or alloy with several integral structures. The single bolt 114 may also be a unitary, monolithic body. In certain examples, the U-shaped bolt 112 and the single bolt 114 can be comprised of a metallic material such as, aluminum alloys, although alternatives are possible.

Turning to FIGS. 30-34, the U-shaped bolt 112 can include a main body 116 that defines a plurality of fluid passages, generally denoted as 118. In the example depicted, the main body 116 has a unique geometry that defines first and second twin passages 120a, 120b and a central passage 122. In certain examples, the first and second twin passages 120a, 120b can be identical parallel passages that are located on opposite sides of the central passage 122. That is, the first and second twin passages 120a, 120b can border the central passage 122.

The main body 116 has a top end 124 and a bottom end 126 that extends in a downward direction from the top end 124. The main body 116 of the U-shaped bolt 112 has a generally flat portion 128 at the top end 124. First and second opposite sides 130, 132 of the main body 116 can define the first and second twin passages 120a, 120b, respectively. In certain examples, the first and second sides 130, 132 of the main body 116 can have a rounded or curved shape, although alternatives are possible.

The bottom end 126 of the main body 116 includes first and second side walls 134a, 134b that taper inwardly from respective first and second opposite sides 130, 132 of the main body 116. The first and second side walls 134a, 134b of the bottom end 126 can define a portion of the central passage 122 that extends in a downward direction from the top end 124. The central passage 122 can serve as a support structure for the U-shaped bolt 112 in certain examples, reinforced structure 136 can be provided along a corner underside 138 (e.g., bottom side) of the main body 116 at first and second ends 140, 142 thereof to improve torsional and compressive strength. The reinforced structure 136 is configured to provide torsional stiffness to the U-shaped bolt 112 in order to resist twisting.

The first and second twin passages 120a, 120b can carry fluid flow in a positive direction and the central passage 122 can carry fluid flow in a negative direction. That is, working oil under pressure can be discharged to flow in a positive direction through the first and second twin passages 120a, 120b (i.e., pressure passages) and be forced to return in an opposite, negative direction through the central passage 122 (i.e., return passage). That is, the first and second twin passages 120a, 120b and the central passage 122 can function respectively as supply and return lines for some operating device or system connected to the first and second twin passages 120a, 120b and the central passage 122.

The first and second twin passage 120a, 120b can serve as the high-pressure side of a pump/motor and the central passage 122 can serve as the low-pressure side of the pump/motor. It is to be noted that the first and second twin passages 120a, 120b are maintained separate and independent from the central passage 122, so that the separate twin passages 120a, 120b and the central passage 122 may be used for either supply or return lines of a hydraulic circuit.

The first and second twin passages 120a, 120b and the central passage 122 can include transitional curved sections 144 (see FIG. 33) that have smooth, curved (e.g., bend) profiles at the first and second ends 140, 142 of the main body 116 of the U-shaped bolt 112 to enhance flow performance and allow for smooth flow transition through the first and second twin passages 120a, 120b and the central passage 122 of the main body 116. The transitional curved sections 144 are configured to eliminate leakage and failure points by providing a smooth transition of non-turbulent fluid flow that is free of sharp corners and leak plugs to improve flow performance.

Figure 34:
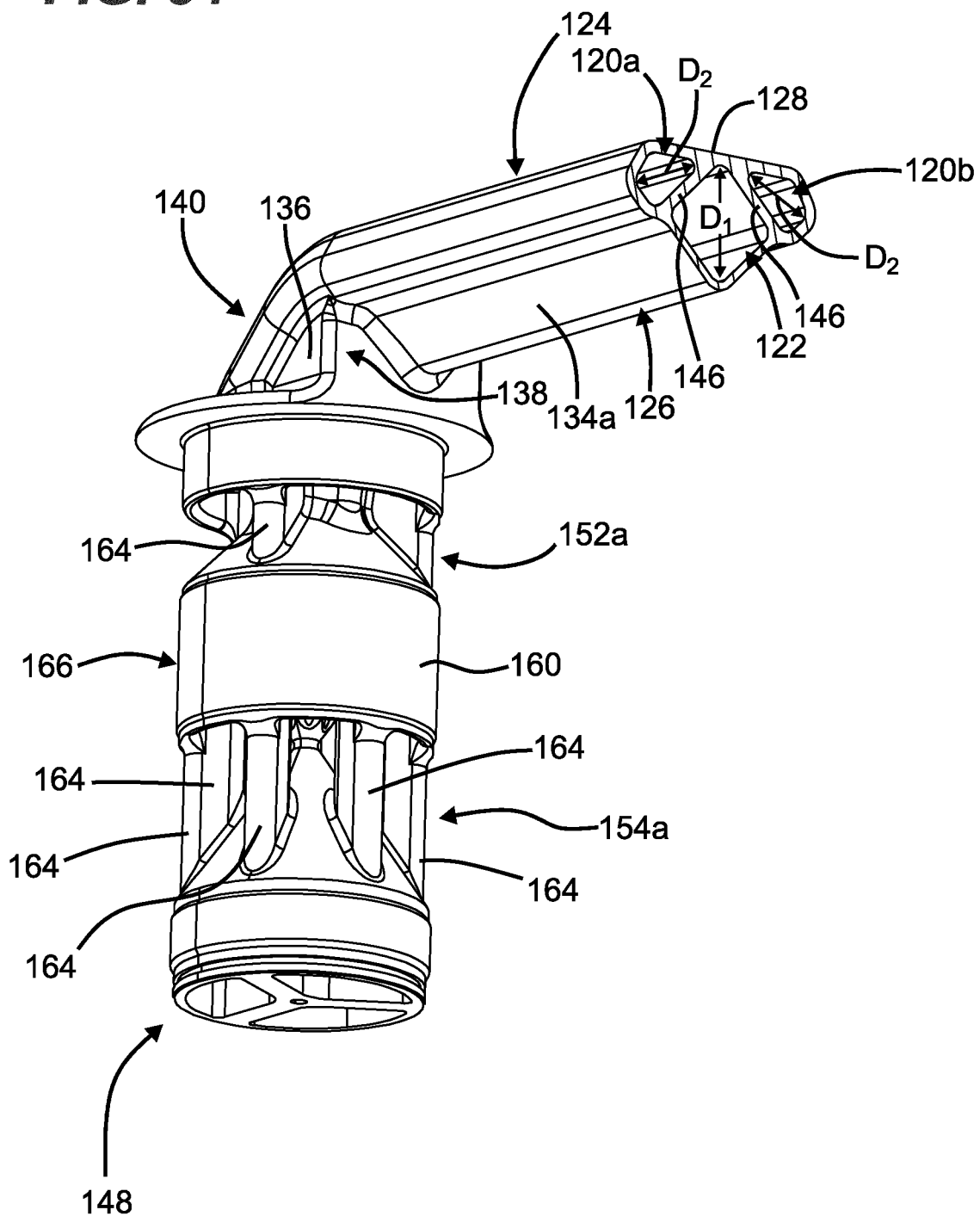
FIG. 34 illustrates another partial cross-sectional view of the U-shaped bolt of FIG. 27.
Figure 35:
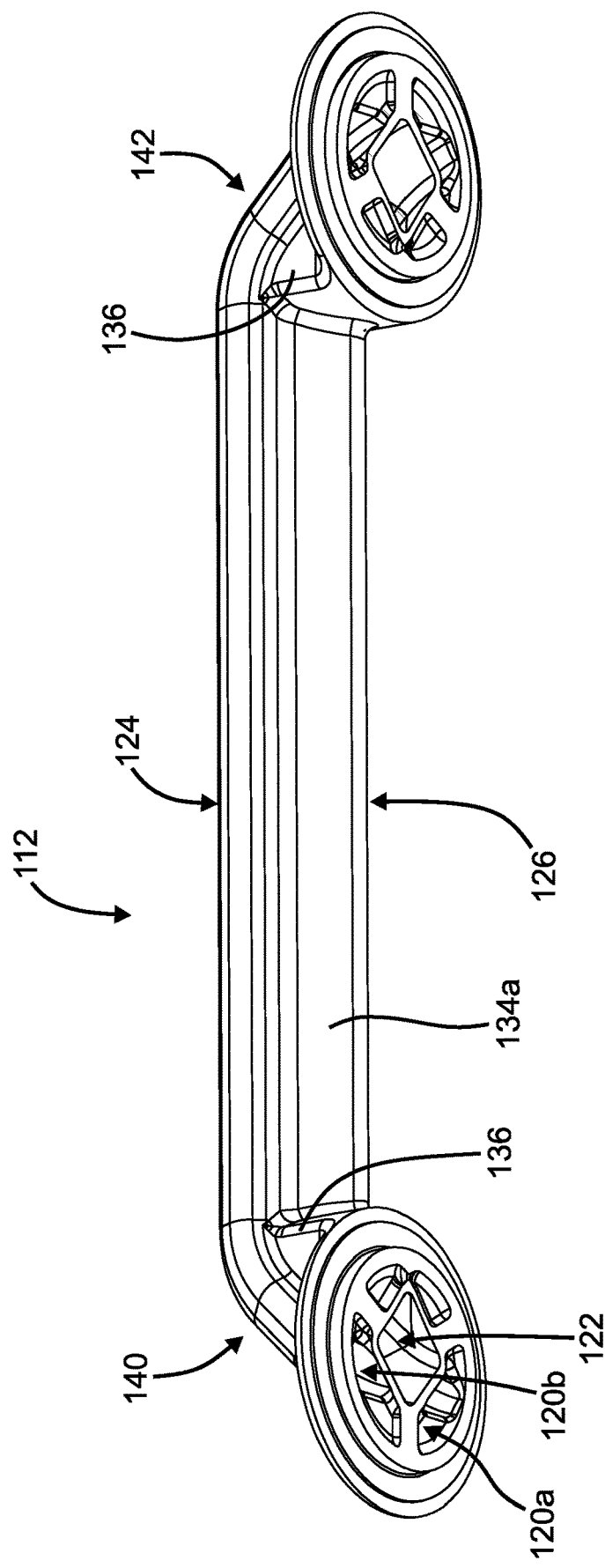
FIGS. 35-40 illustrate multiple cross-sectional views taken along first and second shafts of the U-shaped bolt showing the internal structure in accordance with the principles of the present disclosure.

The central passage 122 can have a first inside diameter $D_1$ (see FIG. 34) and the first and second twin passages 120a, 120b can each have a second inside diameter $D_2$ (see FIG. 34). The first inside diameter $D_1$ of the central passage 122 can be larger than that of the first and second twin passages 120a, 120b. In certain examples, the first inside diameter $D_1$ is about 1.5 times larger than the second inside diameter $D_2$. In certain examples, the first inside diameter $D_1$ is 1.0 to 2.0 times the second inside diameter $D_2$.

The plurality of fluid passages 118 can have a wide variety of different cross-sectional shapes, including, but not limited to, frustoconical cross-sectional shapes, rounded cross-sectional shapes, rectangular cross-sectional shapes, and the like. In certain examples, the plurality of fluid passages 118 can have an angular cross-sectional shape. The central passage 122 can have a generally diamond-shaped cross section. The first and second twin passages 120a, 120b of the main body 116 can have identical cross-sectional shapes.

The first and second twin passages 120a, 120b can be separated from the central passage 122 by divider walls 146 to provide separation between the first and second twin passages 120a, 120b and the central passage 122. As such, the first and second twin passages 120a, 120b can be independent flow paths from the central passage 122. The divider walls 146 can serve as reinforcing structure for the plurality of fluid passages 118.

In certain examples, the first and second twin passages 120a, 120b can deliver about 30) psi of fluid, although alternatives are possible. In certain examples, the first and second twin passages 120a, 120b can deliver at least 300 psi of fluid, although alternatives are possible. The central passage 122 can deliver about 100 psi of fluid back to a reservoir in the system. In certain examples, the central passage 122 can deliver 100 psi or less of fluid back to the reservoir in the system.

Still referring to FIGS. 33-34, the U-shaped bolt 112 includes a first shaft 148 formed at the first end 140 of the main body 116 and a second shaft 150 formed at the second end 142 of the main body 116. The first and second shafts 148, 150 are integrally formed as one unitary, monolithic body with the transitional curved sections 144 and the main body 116 of the U-shaped bolt 112. The first and second shafts 148, 150 can have identical configurations and be structurally formed to reduce pressure drop across the U-shaped bolt 112. As such, only the first shaft 148 will be described in detail. It will be appreciated that the features described herein with reference to the first shaft 148 will also apply to the second shaft 150 and will be denoted with the same reference number.

The first shaft 148 of the U-shaped bolt 112 can define an annular inlet chamber 152a, that is in fluid communication with the first and second twin passages 120a, 120b and an annular outlet chamber 154a that is in fluid communication with the central passage 122. The annular inlet and outlet chambers 152a, 154a can be axially separated from one another (i.e., separated from one another along the axis of the shaft). The annular inlet chamber 152a includes passages 156a through the first shaft 148 that connects to the first and second twin passages 120a, 120b and the annular outlet region 154a includes a passage 158a through the first shaft 148 that connects to the central passage 122. High pressure fluid from an operating device can enter the annular inlet chamber 152a of the first shaft 148 to flow through both the first and second twin passages 120a, 120b and through the annular inlet chamber 152b of the second shaft 150. The hydraulic fluid or oil can return through the annular outlet chamber 154b of the second shaft 150 to flow through the central passage 122 and through the annular outlet chamber 154a of the first shaft 148 to deliver 100 psi of hydraulic fluid or oil back to a hydraulic reservoir in the system. In certain examples, the central passage 122 can deliver 100 psi or less of hydraulic fluid back to the reservoir in the system. The annular outlet chamber 154a of the first shaft 148 is larger in area than that of the central passage 122, so that pressure in the U-shaped bolt 112 is reduced. This pressure drop is primarily a result of the internal structure of the first shaft 148 that provides more open space for fluid to flow unrestricted.

The first shaft 148 includes a sealing surface 160a (e.g., bearing surface) that receives a first tubular sleeve 162a (see FIG. 28)(e.g., first fluid flow component interface, first connector housing). The additively manufactured first shaft 148 can be formed as hollow tubes with the minimal amount of material required to prevent the first shaft 148 from breaking or rupturing.

Figure 36:
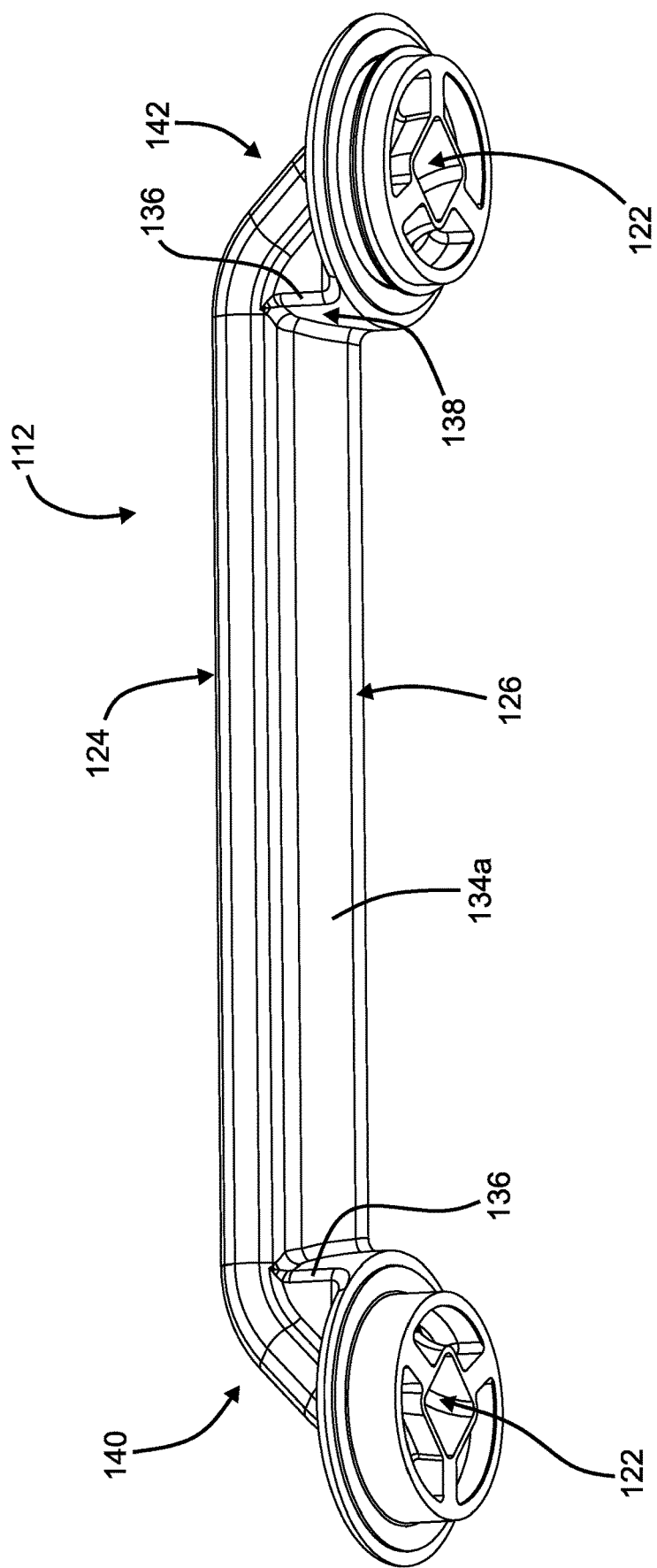
Figure 37:
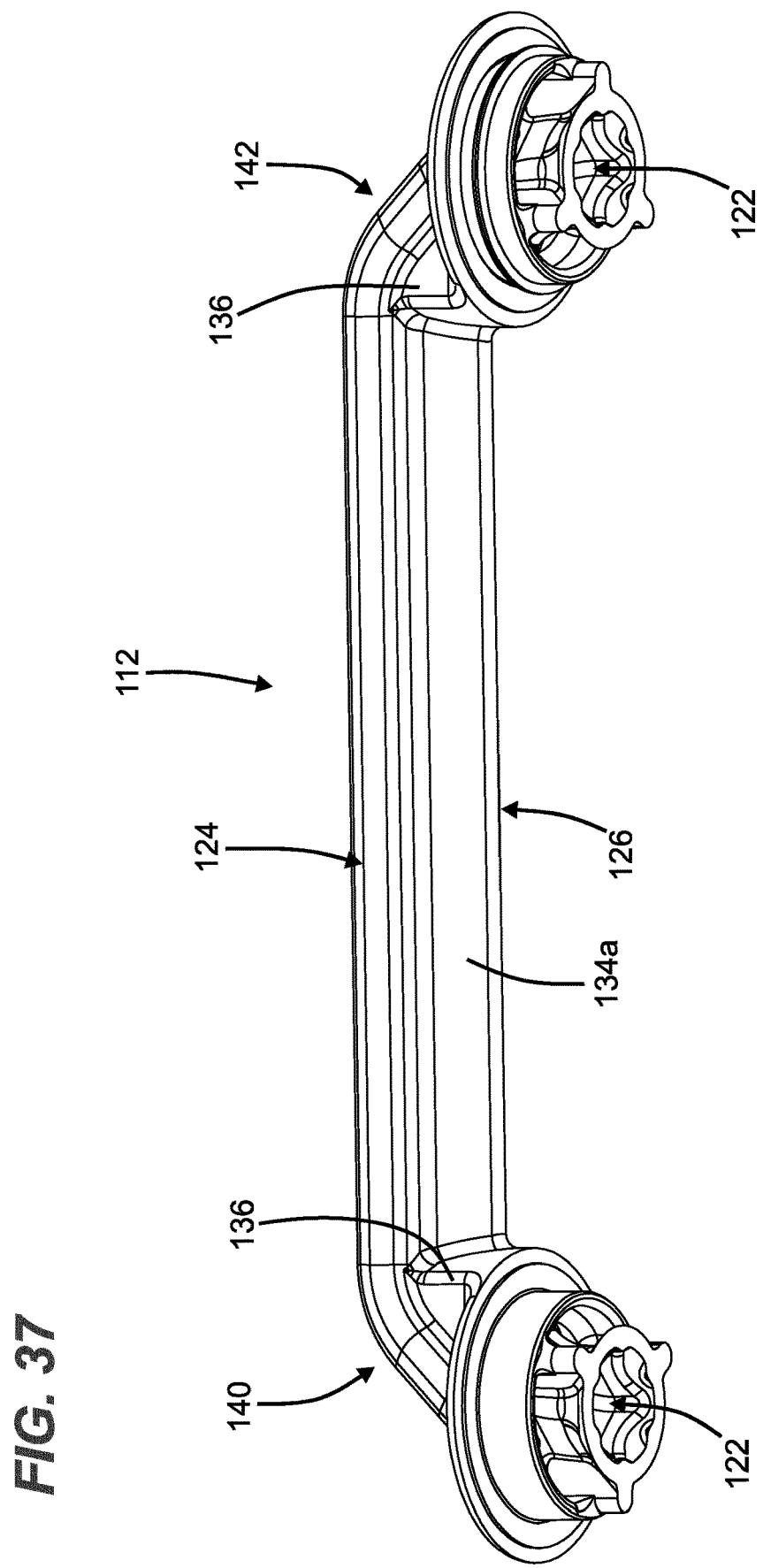

Turning to FIGS. 35-40, radial walls 164 may be formed in the annular inlet chamber 152a. The radial walls 164 can extend radially from the central passage 122 toward an outer circumferential wall 166 of the first shaft 148. The central passage 122 has a consistent cross-sectional shape along the main body 116 which can vary as the central passage 122 enters the first shaft 148. As the central passage 122 extends along a length 168 (see FIG. 30) of the first shaft 148, the central passage 122 gradually increases in cross-sectional area. That is, the central passage begins to open up such that the geometry changes from a squared shape or cross-section as shown in FIG. 36 to a circular shape or cross-section as shown in FIG. 37. The cross-section of the central passage 122 may be square, rectangular, circular, semi-circular, oval, diamond, pentagon, hexagon, heptagon, octagon, nonagon. The cross-section, geometry, orientation, size, shape, and/or configuration of the central passage 122 may be different or the same along the length 168 of the first shaft 148.

Figure 38:
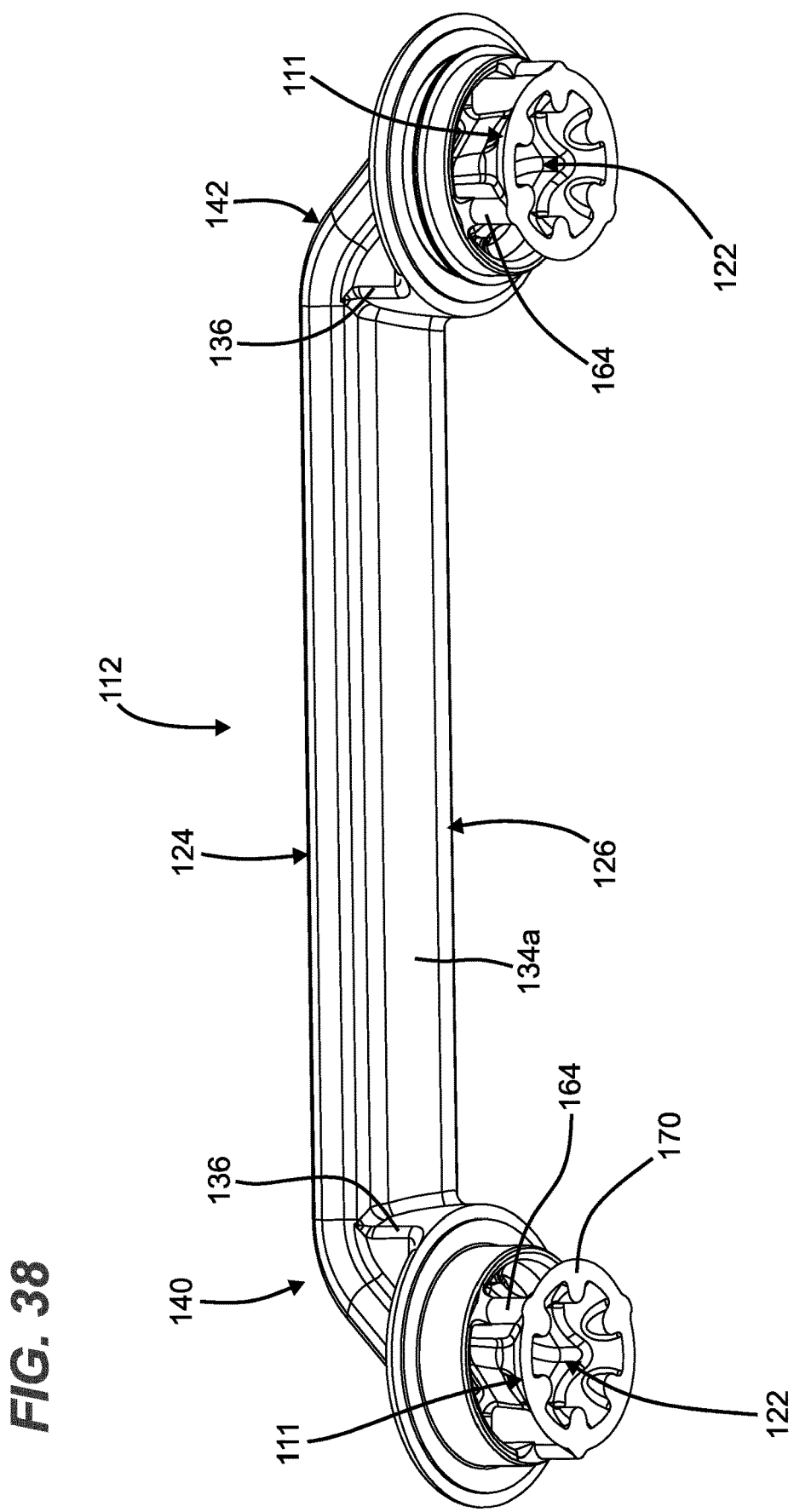
Figure 39:
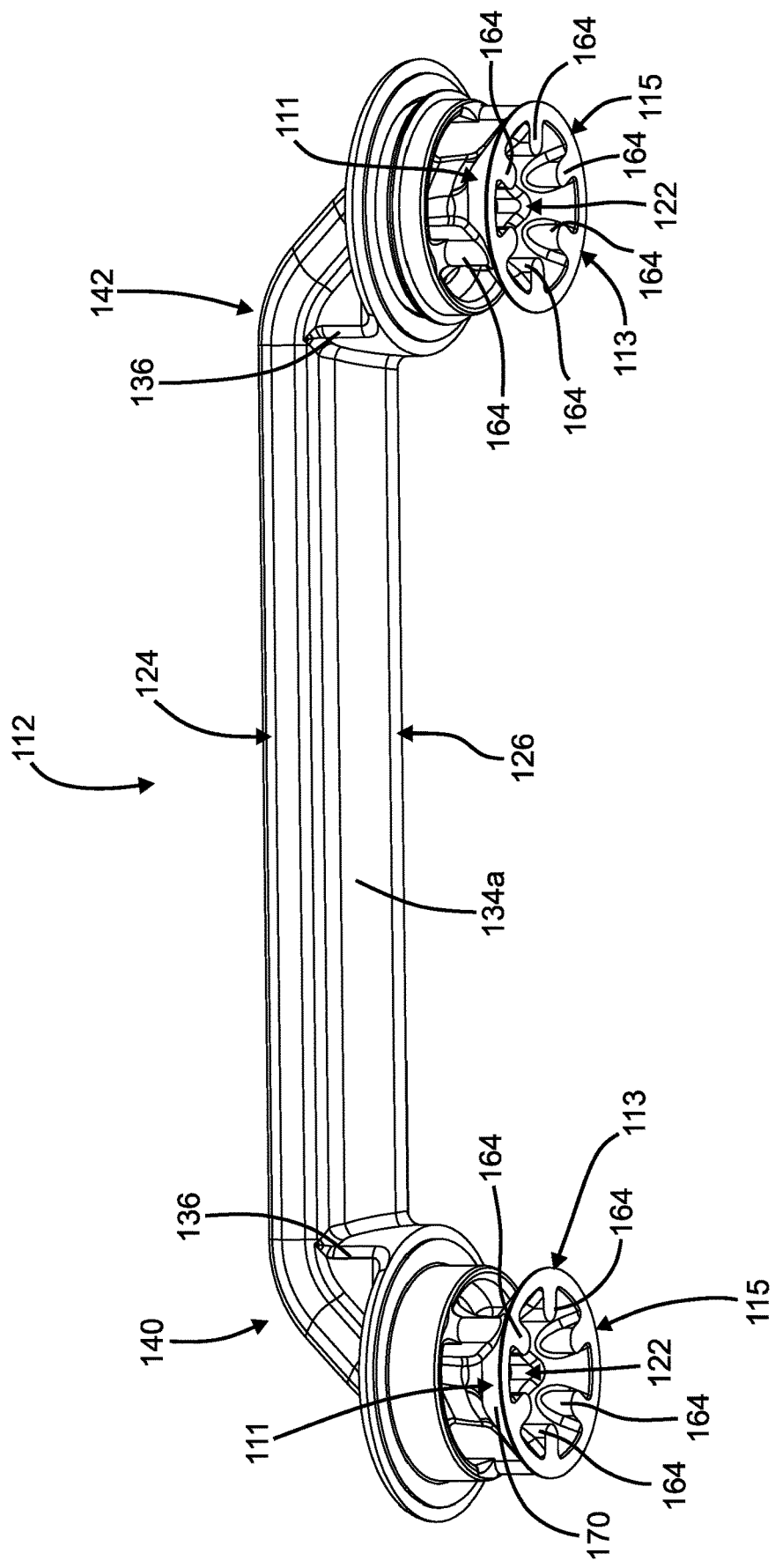
Figure 40:
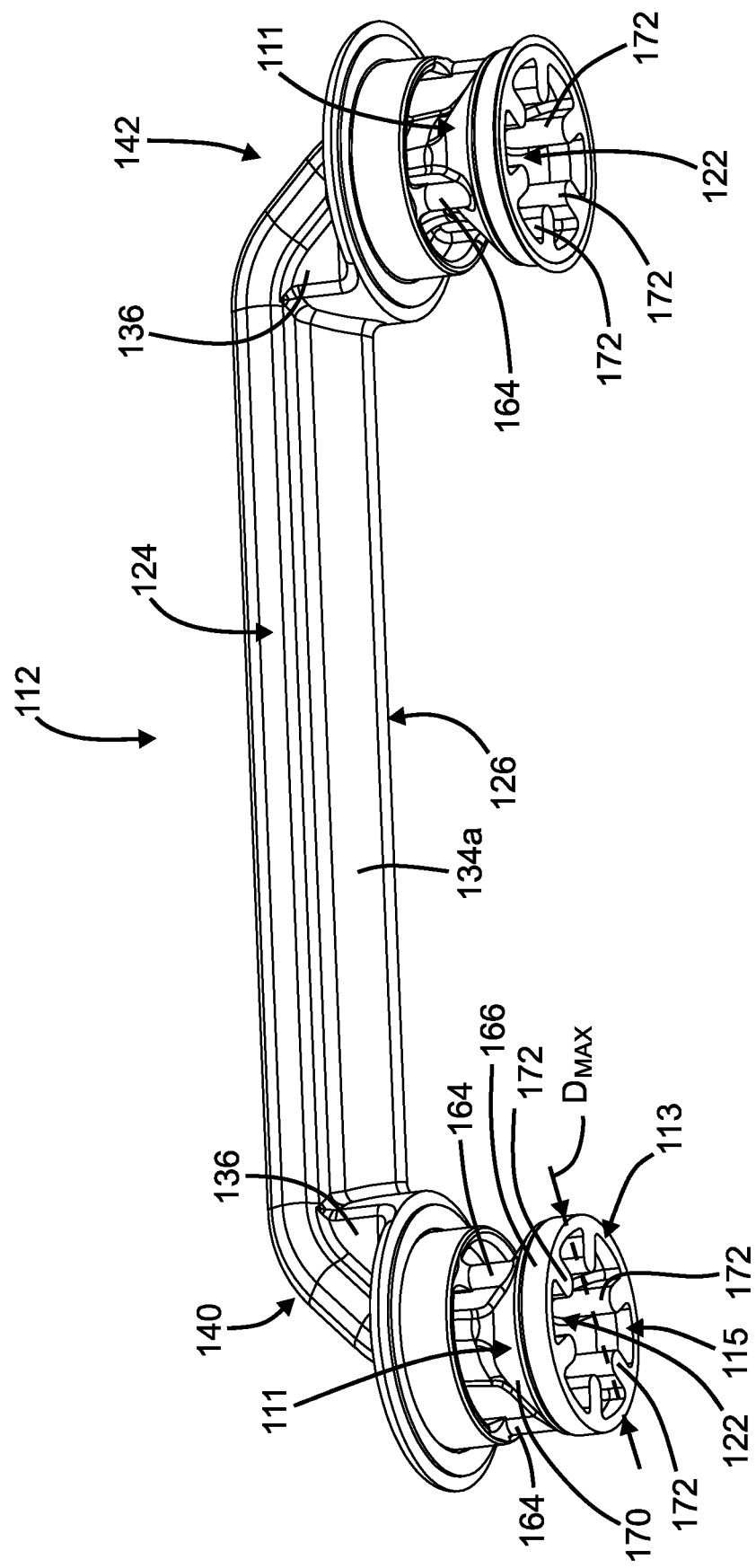
Figure 41:
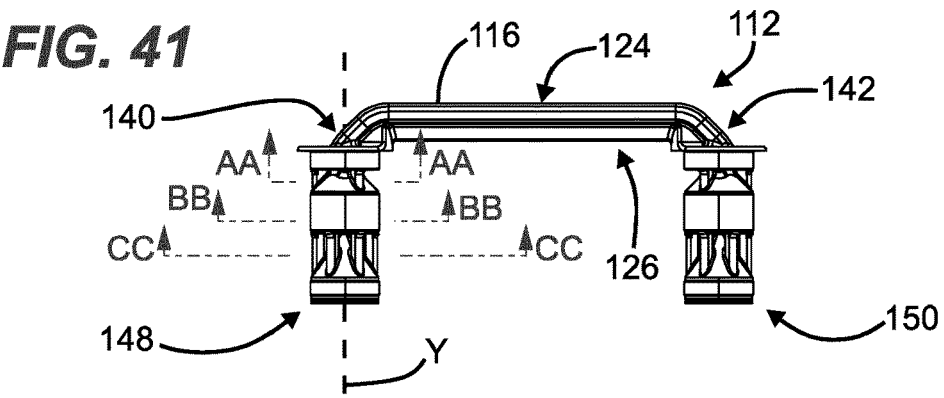
FIG. 41 illustrates a side view of the U-shaped bolt of FIG. 27.
Figure 42:
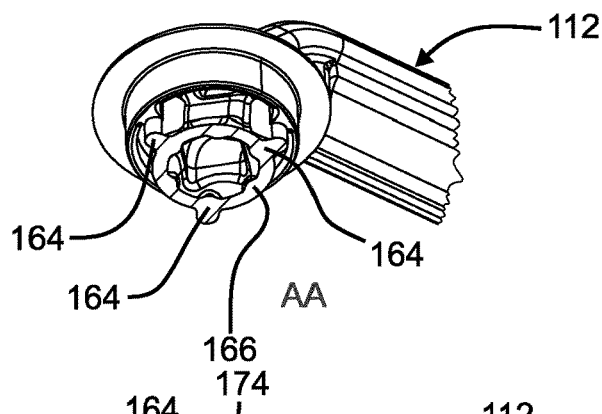
FIG. 42 illustrates a cross-sectional view taken along line AA-AA of FIG. 41.
Figure 43:
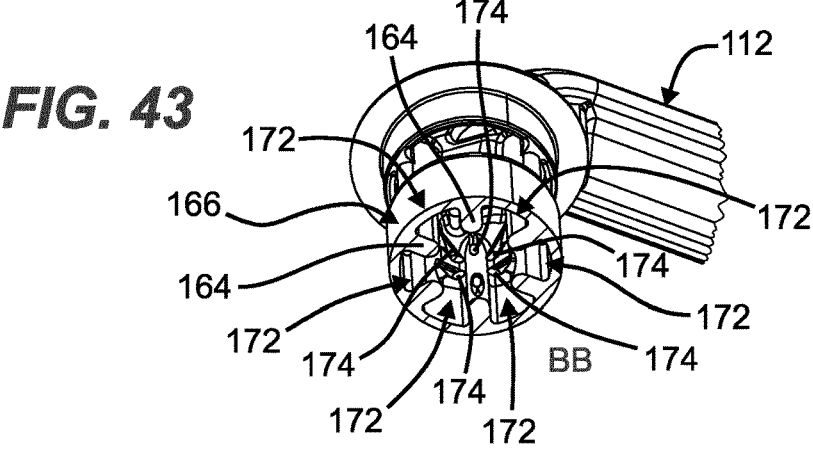
FIG. 43 illustrates a cross-sectional view taken along line BB-BB of FIG. 41.
Figure 44:
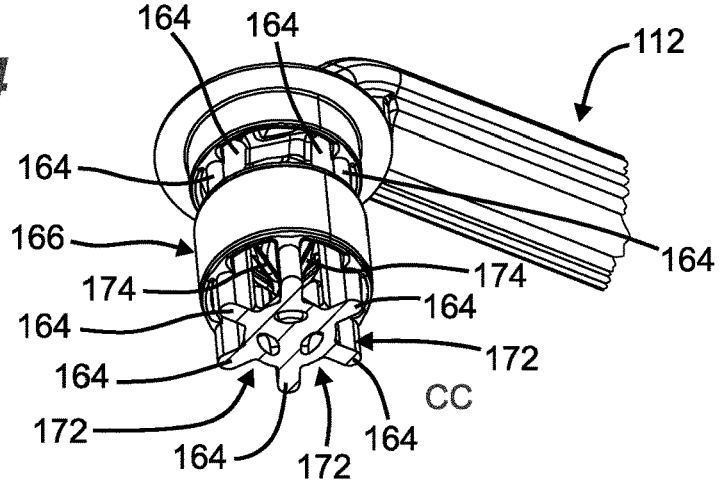
FIG. 44 illustrates a cross-sectional view taken along line CC-CC of FIG. 41.
Figure 45:
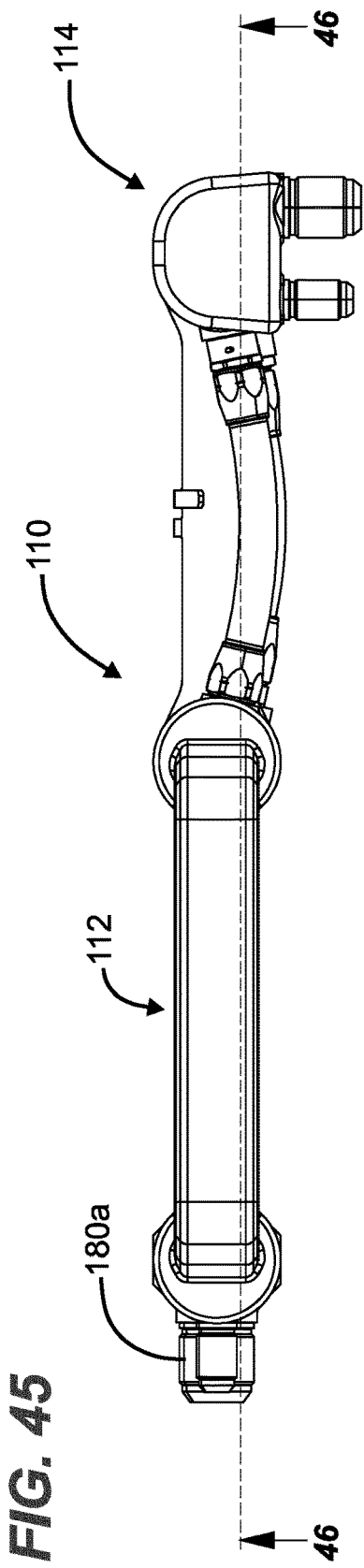
FIG. 45 illustrates a top view of the hydraulic swivel bolt of FIG. 27.
Figure 46:
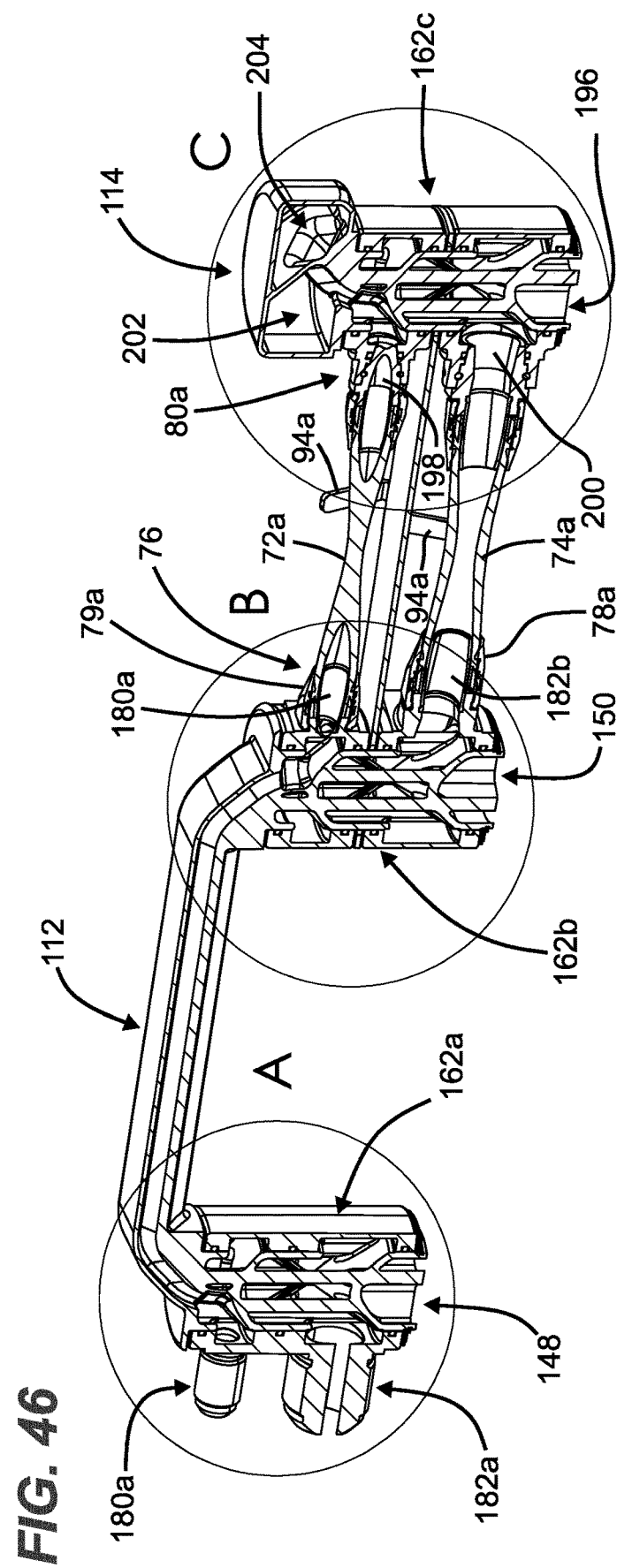
FIG. 46 illustrates a cross-sectional view taken along line 46-46 of FIG. 45.

The first inside diameter D1 of the central passage 122 increases along the length of the first shaft 148 as depicted in FIGS. 38-40. For example, the central passage 122 can widen circumferentially along the length 168 of the first shaft 148 thereby changing the geometry of the divider walls 146 and the first and second side walls 134a, 134b that together define the central passage 122. In certain examples, the central passage 122 can be a tapered passage with a narrow portion 111 and a wide portion 113 that forms a conical shaped body 170 with an enlarged opening 115 at the wide portion 113 of the first shaft 148. The conical shaped body 170 of the first shaft 148 can expand outwardly along the length 168 to a maximum diameter $D_{Max}$ at the outer circumferential wall 166.

Turning to FIGS. 41-44, the first shaft 148 is defined with minimal structure such that the central passage 122 can expand open in a direction along a central axis Y of the first shaft 148. The radial walls 164 continue to extend along the length 168 of the first shaft 148 to define a plurality of passageways 172. That is, the plurality of passageways 172 can be defined between the radial walls 164 circumferentially about the central axis Y of the first shaft 148 relative to one another.

The passageways 172 can all merge together into the annular outlet chamber 154a where fluid can flow in multiple directions while being contained within the first tubular sleeve 162a The passageways 172 is in fluid communication with the central 2 passage 122 for improving flow performance. That is, fluid can flow through the central passage 122, between the radial walls 164 and through all of the passageways 172. The passageways 172 do not have any fluid communication with the first and second twin passages 120a, 120b.

The passageways 172 help to reduce overall pressure drop of the U-shaped bolt 112 by allowing fluid to flow out in multiple directions. That is, the passageways 172 provide more open area for fluid to flow freely with less restriction. In the example depicted, there are six passageways 172 that are defined by the radial walls 164, although alternatives are possible. The configuration of the first shaft 148 can form a geometric profile that is configured to improve flow performance while reducing the overall mass weight of the swivel bolt 110. This is advantageous because as the swivel bolt 110 moves, any changes in the pressure drop will be minimized and a more consistent pressure drop can be achieved no matter how far the swivel bends. That is, there can be a consistent pressure drop through the entire rotation of the swivel bolt 110 such that regardless of the rotational direction of the first tubular sleeve 162a about the first shaft 148, fluid flow through the swivel bolt 110 will remain the same. In certain examples, the U-shaped bolt 112 can have a pressure drop between about 4 psi to about 5 psi, although alternatives are possible.

Figure 47:
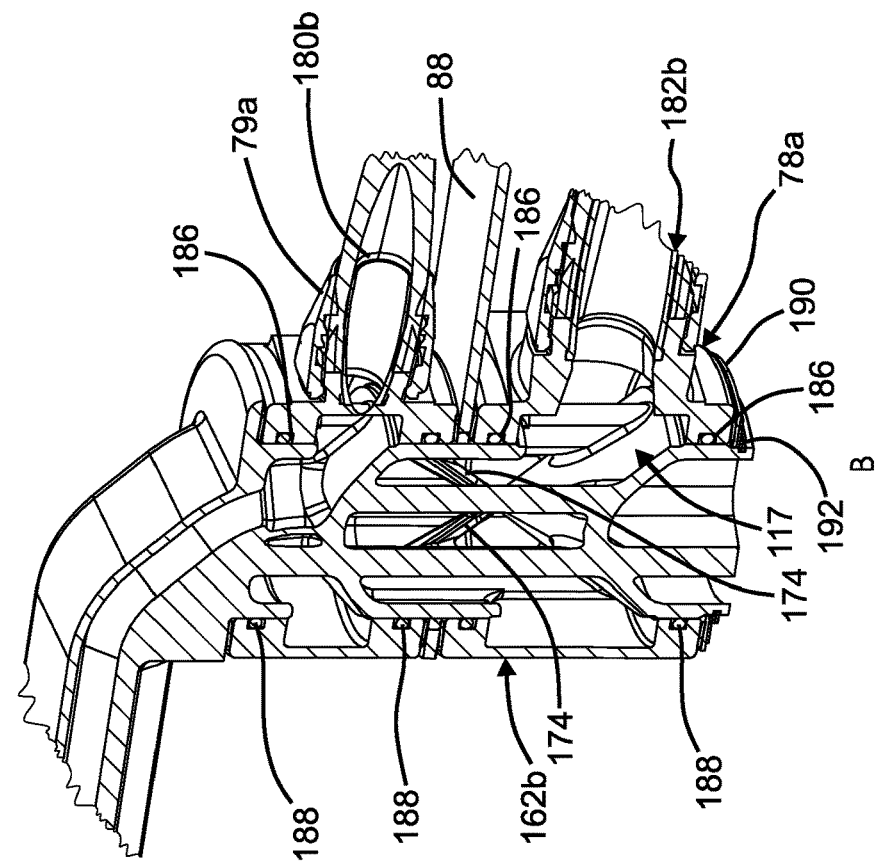
FIG. 47 illustrates an enlarged view of a portion of FIG. 46.
Figure 48:
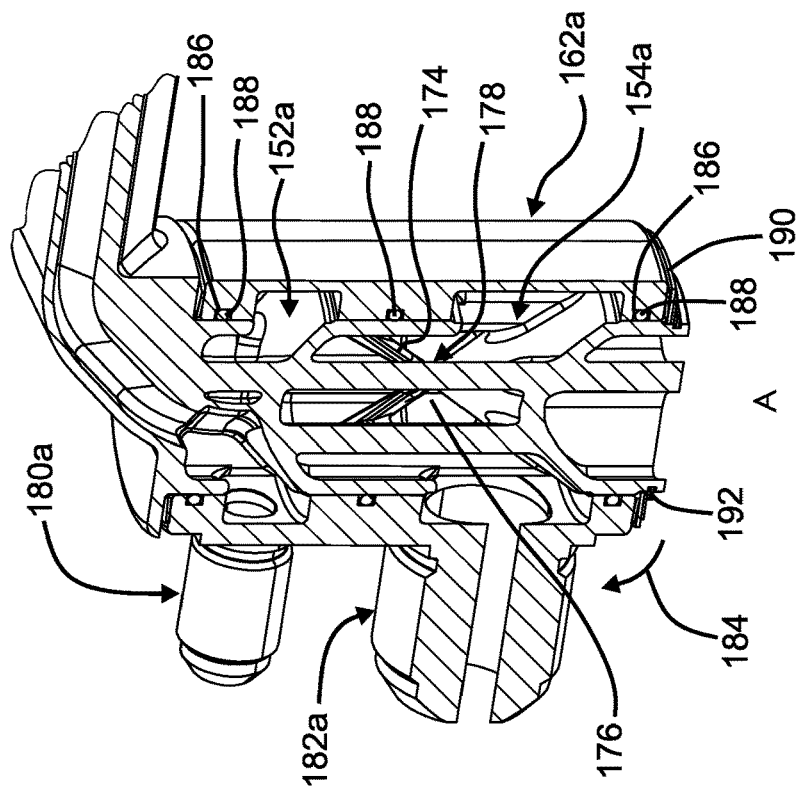
FIG. 48 illustrates an enlarged view of a portion of FIG. 46.
Figure 49:
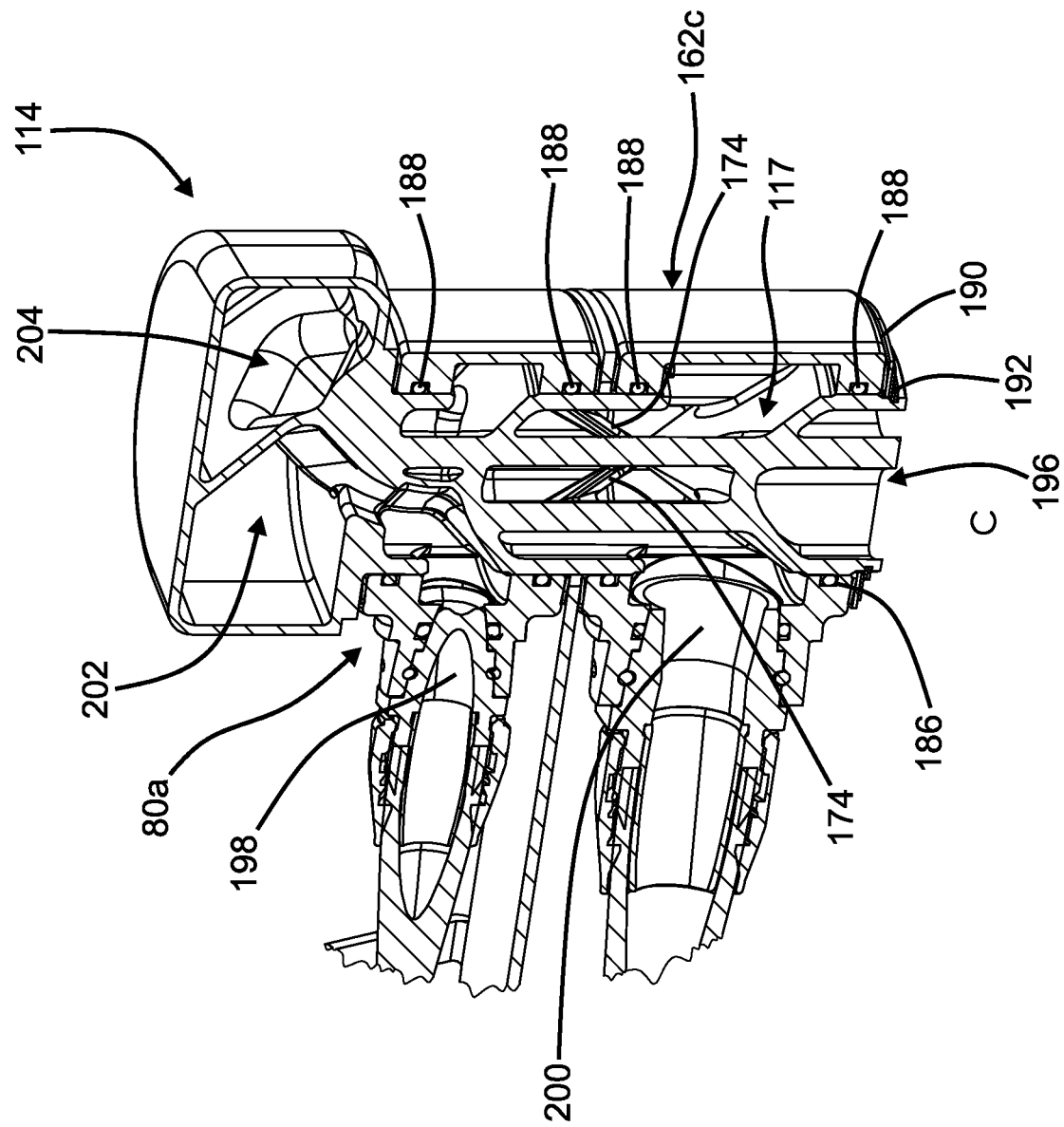
FIG. 49 illustrates an enlarged view of a portion of FIG. 46.

The radial walls 164 can serve as the support structure for the swivel bolt 110. Additional supporting legs 174 can be provided within the outer circumferential wall 166 of the first shaft 148. The supporting legs 174 can merge together about a distal end 176 (see FIG. 33) within an interior 178 (see FIG. 47) to provide structure for the U-shaped bolt 112 that allows the U-shaped bolt 112 to be self-supporting. The supporting legs 174 come together to mate with another conical structure 117. In certain examples, the supporting legs 174 and the conical structure 1117 can have an hourglass configuration in a longitudinal direction.

Referring to FIGS. 45-48, the first tubular sleeve 162a include an input port 180a and an output port 182a, for connecting to another system configured to be in fluid communication with both the first and second twin passages 120a, 120b and the central passage 122 of the U-shaped bolt 112. Hydraulic fluid can fill the respective annular inlet and outlet chambers 152a, 154a and flow within the first tubular sleeve 162a along the sealing surface 160a of the first shaft 148. The U-shaped bolt 112 is configured to allow fluid communication between the input and output ports 180a, 182a of the first tubular sleeve 162, the annular inlet and outlet chambers 152a, 154a of the first shafts 148, the first and second twin passages 120a, 120b and the central passage 122 of the main body 116. During operation, the first tubular sleeve 162a rotates or pivots about a rotational axis 184 such that hydraulic fluid can flow through the annular inlet and outlet chambers 152a, 154a, the first and second twin passages 120a, 120b and the central passage 122, irrespective of where the input and output ports 180a, 182a are positioned relative to the annular inlet and outlet chambers 152a, 154a.

The sealing surface 160a of the first shaft 148 can define recesses 186 provided at spaced points circumferentially thereabout for receiving seals 188. The seals 188 can be preinstalled in the recesses 186. A snap ring (e.g., retainer ring) 190 can be provided to keep the first tubular sleeve 162a attached to the first shafts 148, thereby preventing the first tubular sleeve 162a from sliding off. A dust seal 192 can be provided to prevent dust from getting into the U-shaped bolt 112.

The input and output ports 180b, 182b of a second tubular sleeve 162b of the second shaft 150 can be attached to respective, first and second flexible hydraulic hoses 72a, 74a at a first end 76a thereof via hose fittings 78a, 79a. As described above, the hose fittings 78a, 79a can also be attached to opposite, second ends 80a of the first and second flexible hydraulic hoses 72a, 74a for connecting to the single bolt 114. The internal structure of the single bolt 114 is also configured to improve flow performance and reduce pressure drop.

Referring to FIGS. 49-52, illustrations of the single bolt 114 is depicted. The U-shaped bolt 112 and the single bolt 114 are adapted to pivot or rotate relative to one another at swivel joint location 194. The single bolt 114 includes a single bolt shaft 196 that has a configuration similar to the first and second shafts 148, 150 of the U-shaped bolt 112. The single bolt tubular sleeve 162c can have similar features to those described above with reference to the first and second tubular sleeves 162a, 162b. The single bolt tubular sleeve 162c can rotate and pivot about rotational axis 184.

As described above with reference to the U-shaped bolt 112, a single bolt tubular sleeve 162c can be mounted over the single bolt shaft 196 and retained thereon with the snap ring 190.

The single bolt tubular sleeve 162c can include a fluid flow component interface that has a fluid flow component interface inlet (e.g., input port) 198 and a fluid flow component interface outlet (e.g., output port) 200. The single blot 114 can include a first passageway 202 fluidically configured to connect with the fluid flow component interface inlet 198 of that flow path, and a second passageway 204 fluidically configured to connect with the fluid flow component interface outlet 200 of that flow path. The first and second passageways 202, 204 of the single bolt 114 have separate, independent pathways.

Similar to the swivel bolt 10, the swivel bolt 110 can also include an elongated metal band 88a to provide a pivotal attachment between the second tubular sleeve 162b of the U-shaped bolt 112 and the single bolt tubular sleeve 162c of the single bolt 114. The elongated metal band 88a includes tabs 94a designed to help prevent the first and second flexible hydraulic hoses 72a, 74a from twisting or flipping over one other. The hose fittings 78a, 79a at the second ends 80a of the first and second flexible hydraulic hoses 72a, 74a can be attached to radial input and output ports 198, 200 of the single bolt tubular sleeve 162c. The first and second passageways 202, 204 can be uniquely formed in the single bolt 114 via additive manufacturing to include the advantageous features described above with respect to the U-shaped bolt 112 but with a different geometry.

The additive manufacturing process reduces the overall weight of the single bolt 114 compared to conventional single bolts. In certain examples, additively manufactured single bolt 114 has 30% to about 50% less weight compared to conventionally made single bolts.

The single bolt 114 also includes axial inlet and outlet ports 206, 208 that extend from a body 210 at about 90 degrees. The inlet and outlet ports 206, 208 communicate with the first and second passageways 202, 204 and the radial input and output ports 198, 200 of the single bolt 114 respectively. The axial inlet and outlet ports 206, 208, the first and second passageways 202, 204 and the radial input and output ports 198, 200 of the single bolt 114 can have a unitary construction.

The inlet and outlet ports 206, 208 can provide fluid connection with another fluid system. During operation, hydraulic fluid from the U-shaped bolt 112 can flow into the radial input port 198 of the single bolt 114 through the first passageway 202 and exit through the axial outlet port 206 at the high-pressure side. Hydraulic fluid can return through the axial inlet port 208, the second passageway 204 and exit the radial output port 200 of the single bolt 114 at the low-pressure side. The first and second flexible hydraulic hoses 72a, 74a are configured to allow high-pressure fluid and low-pressure fluid to pass between the single bolt 114 and the U-shaped bolt 112.

Another aspect of the present disclosure relates to a method of making a hydraulic swivel bolt constructed by additive manufacturing using a powder, metallic material, such as, titanium, according to the principles of the present disclosure.

At step 302, the exemplary method 300 may include printing a three-dimensional swivel bolt using additive manufacturing.

In certain examples, an electron beam can be used to melt layers of titanium class 5 material such that the layers are stacked together to build a solid swivel bolt. Simultaneously, thermal processing (e.g., sintering) can be performed.

At step 304, the exemplary method 300 may include transporting the three-dimensional printed swivel bolt to a post-processing station.

In certain examples, sintered powder (e.g., loosely packed powder) can be removed by running a boring tool within passages of the swivel bolt where pressurized air is used to blast sintered powder out the passages. In certain examples, the pressurized air can include titanium powder that acts as an abrasive to blast out sintered powder to empty or clear out the passages.

At step 306, the exemplary method 300 may include exposing the three-dimensional printed swivel bolt to a chemical milling process.

In certain examples, the three-dimensional printed swivel bolt can be immersed in a solvent bath to provide a step of controlled material removal. The three-dimensional swivel bolt can be immersed for about one to five minutes. The solvent may be any solvent suitable for dissolving or removing loose powder. For example, the solvent may be nitric acid, although alternatives are possible. The solvent bath may eat away tiny layers of powder material of about 0.015 inch such that only the solid metal remains. In certain examples, the solvent bath can change the surface roughness to provide the three-dimensional swivel bolt with a smooth surface.

At step 308, the exemplary method 300 may include heat treating the three-dimensional printed swivel bolt with hot isostatic pressing to improve material properties.

In certain examples, the three-dimensional swivel bolt is placed in a pressure chamber of high pressure and high heat to help firm up the microstructure of the swivel bolt. The three-dimensional swivel bolt can be treated for about two hours. The hot isostatic pressing process results in the three-dimensional swivel bolt having improved static mechanical properties (both strength and yield) and isotropic mechanical properties.

At step 310, the exemplary method 300 may include machining the three-dimensional printed swivel bolt.

In certain examples, the three-dimensional swivel bolt can be transferred to a machine house to be machined to form a final pan with bearing and sealing surfaces. Ports of the three-dimensional swivel bolt may be cleaned and smoothed out to improve fatigue performance.

EXAMPLE ASPECTS OF THE DISCLOSURE

Aspect 1. A hydraulic swivel bolt comprising.
a main body constructed by additive manufacturing and defining at least two fluid parallel passages extending between opposite first and second ends of the main body; and
a first shaft at the first end and a second shaft at the second end, at least one of the two fluid parallel passages being in fluid communication with the first and second shafts;
wherein the first and second shafts each define a first port in fluid communication with one of the at least two fluid parallel passages and a second port in fluid communication with the other one of the at least two fluid parallel passages, the first and second ports being axially separated from one another, and
wherein the first shaft provides a first sealing surface for a first tubular sleeve and the second shaft provides a second sealing surface for a second tubular sleeve, the first and second tubular sleeves being pivotable about a rotational axis.

Aspect 2. The hydraulic swivel bolt of aspect 1, wherein the at least two fluid parallel passages of the main body and the first and second shafts are a unitary body.

Aspect 3. The hydraulic swivel bolt of aspect 1 or 2, wherein the main body includes reinforcing ribs to improve torsional and compressive strength.

Aspect 4. The hydraulic swivel bolt of any of aspects 14, wherein the first and second tubular sleeves are fluid flow component interfaces that each include a fluid flow component interface inlet and a fluid flow component interface outlet.

Aspect 5 The hydraulic swivel bolt of aspect 1, wherein the hydraulic swivel bolt includes a U-shaped bolt.

Aspect 6. The hydraulic swivel bolt of aspect 1, further comprising an additively manufactured single bolt.

Aspect 7. The hydraulic swivel bolt of aspect 6, wherein the single bolt includes a single bolt sleeve that includes a fluid flow component interface inlet and a fluid flow component interface outlet.

Aspect 8. The hydraulic swivel bolt of aspect 6, further comprising hoses for connecting hydraulic fluid flow between the U-shaped bolt and the single bolt.

Aspect 9. The hydraulic swivel bolt of aspect 6, wherein the U-shaped bolt and the single bolt pivot relative to one another about a swivel joint.

Aspect 10. The hydraulic swivel bolt of aspect 7, wherein the single bolt includes separate, independent passageways configured to be in fluid communication with the fluid flow component interface inlet and the fluid flow component interface outlet, respectively.

Aspect 11. A hydraulic swivel bolt comprising:
a main body constructed by additive manufacturing and defining a first fluid passage and a second fluid passage parallel to the first fluid passage, the first and second fluid passages extending between opposite first and second ends of the main body; and
a first shaft at the first end and a second shaft at the second end, the first and second fluid passages having curved profiles at the first and second ends of the main body forming non-plugged pathways leading to the first and second shafts for improving flow performance;
the first and second shafts each defining a first port in fluid communication with the first fluid passage and a second port in fluid communication with the second fluid passage, the first and second ports being axially separated from one another;
wherein the first shaft provides a first sealing surface for a first tubular sleeve and the second shaft provides a second sealing surface for a second tubular sleeve, the first and second tubular sleeves being pivotable about a rotational axis.

Aspect 12. The hydraulic swivel bolt of aspect 11, wherein the first and second fluid passages of the main body and the first and second shafts are a unitary body.

Aspect 13. The hydraulic swivel bolt of aspect 11 or 12, wherein the main body includes reinforcing ribs to improve torsional and compressive strength.

Aspect 14. The hydraulic swivel bolt of any of aspects 11-13, wherein the first and second tubular sleeves are fluid flow component interfaces that each include a fluid flow component interface inlet and a fluid flow component interface outlet.

Aspect 15. The hydraulic swivel bolt of aspect 11, wherein the hydraulic swivel bolt includes a U-shaped bolt.

Aspect 16. The hydraulic swivel bolt of aspect 15, further comprising an additively manufactured single bolt.

Aspect 17. The hydraulic swivel bolt of aspect 16, wherein the single bolt includes a single bolt sleeve that includes a fluid flow component interface inlet and a fluid flow component interface outlet.

Aspect 13. The hydraulic swivel bolt of aspect 16, further comprising a connection member for connecting hydraulic fluid flow between the U-shaped bolt and the single bolt.

Aspect 19. The hydraulic swivel bolt of aspect 16, wherein the U-shaped bolt and the single bolt pivot relative to one another about a swivel joint.

Aspect 20. The hydraulic swivel bolt of aspect 17, wherein the single bolt includes separate, independent passageways configured to be in fluid communication with the fluid flow component interface inlet and the fluid flow component interface outlet, respectively.

Aspect 21. A hydraulic swivel bolt comprising:
a main body constructed by additive manufacturing and defining a central passage and twin passages that boarder the central passage, the central passage and twin passages running parallel to each other between opposite first and second ends of the main body; and
a first shaft at the first end and a second shaft at the second end, a plurality of internal walls extending along a length of the first and second shafts to form a plurality of passageways in fluid communication with the central passage for improving flow performance, wherein the central passage gradually increases in cross-sectional area along a length of the first and second shafts;
the first and second shafts each defining a first port in fluid communication with the twin passages and a second port in fluid communication with the central passage, the first and second ports being axially separated from one another;
wherein the first shaft provides a first sealing surface for a first tubular sleeve and the second shaft provides a second sealing surface for a second tubular sleeve, the first and second tubular sleeves being pivotable about a rotational axis.

Aspect 22. The hydraulic swivel bolt of aspect 21, wherein the central passage, the twin passages, and the first and second shafts are a unitary body.

Aspect 23 The hydraulic swivel bolt of aspect 21 or 22, wherein the first and second tubular sleeves are fluid flow component interfaces that each include a fluid flow component interface inlet and a fluid flow component interface outlet.

Aspect 24. The hydraulic swivel bolt of aspect 21, wherein the hydraulic swivel bolt includes a U-shaped bolt.

Aspect 25. The hydraulic swivel bolt of aspect 24, further comprising an additively manufactured single bolt.

Aspect 26. The hydraulic swivel bolt of aspect 25, wherein the single bolt includes a single bolt sleeve that includes a fluid flow component interface inlet and a fluid flow component interface outlet.

Aspect 27. The hydraulic swivel bolt of aspect 25, wherein the U-shaped bolt and the single bolt pivot relative to one another about a swivel joint.

Aspect 28. The hydraulic swivel bolt of aspect 26, wherein the single bolt includes separate, independent passageways configured to be in fluid communication with the fluid flow component interface inlet and the fluid flow component interface outlet, respectively.

Aspect 20. A hydraulic swivel bolt comprising:
a U-shaped bolt constructed by additive manufacturing, the U-shaped bolt including a plurality of passages that form troughs that extend along a length of the U-shaped bolt, the plurality of passages being parallel to one another;
a single bolt constructed by additive manufacturing, the single bolt including passageways that are configured to be in fluid communication with the plurality of passages of the U-shaped bolt; and
a connection member for connecting hydraulic fluid flow between the U-shaped bolt and the single bolt.

Aspect 30. The hydraulic swivel bolt of aspect 29, wherein the U-shaped bolt and the single bolt pivot relative to one another about a swivel joint.

Aspect 31. The hydraulic swivel bolt of aspect 29, wherein the U-shaped bolt has a mass weight of about 3 pounds.

Aspect 32. The hydraulic swivel bolt of aspect 29, wherein the single bolt has a mass weight of about 1 pound.

Aspect 33. The hydraulic swivel bolt of aspect 29, wherein the first and second passages of the U-shaped bolt are free of leak plugs and of substantially right angles for providing improved flow performance.

Aspect 34. The hydraulic swivel bolt of aspect 29, wherein the passageways of the single bolt are free of leak plugs and of substantially right angles for providing improved flow performance.

Aspect 35. A method for manufacturing a hydraulic swivel bolt, comprising:
forming a hydraulic swivel bolt using additive manufacturing.

Aspect 36. The method of aspect 35, wherein the hydraulic swivel bolt includes a U-shaped bolt and a single bolt, wherein hydraulic fluid flow is communicated between passages of the U-shaped bolt and passageways of the single bolt via connection members.

Aspect 37. The method of aspect 36, wherein the U-shaped bolt includes multiple passages that are parallel, the multiple passages being free of substantially right angles and of leak plugs.

Aspect 38. The method of aspect 37, wherein the U-shaped bolt includes a first shaft positioned at a first end of the U-shaped bolt, and a second shaft positioned at a second end of the U-shaped bolt, wherein the multiple passages extend from the first end to the second end of the U-shaped bolt, and wherein the single bolt includes a third shaft.

Aspect 39. The method of aspect 38, wherein die first, second, and third shafts each include internal walls that have variable thicknesses along a longitudinal axis.

Aspect 40. The method of aspect 38, wherein the first, second, and third shafts each define first and second ports that are axially separated from one another.

Various modifications and alterations of this disclosure will become apparent to those skilled in the art without departing from the scope and spirit of this disclosure, and it should be understood that the inventive scope of this disclosure is not to be unduly limited to the illustrative embodiments set forth herein.

What is claimed is:
1. A hydraulic swivel system comprising:
a U-shaped fluid conveyance structure having a monolithic construction provided by additive manufacturing, the U-shaped fluid conveyance structure including a main body having first and second opposite ends, the U-shaped fluid conveyance structure also including a first shaft that projects from the first end of the main body and a second shaft that projects from the second end of the main body, the first shaft being unitary with the first end of the main body and the second shaft being unitary with the second end of the main body, the first and second shafts being parallel and both projecting outwardly from the main body in a common direction;
the U-shaped fluid conveyance structure defining first and second fluid passages that extend through the main body and along the first and second shafts, the first and second fluid passages having smooth curved transitions at the first and second ends of the main body for transitioning from the main body to the first and second shafts;
a first sleeve mounted on the first shaft and being configured to swivel about the first shaft, the first sleeve including first and second outer hose connection locations, the hydraulic swivel system defining a first sealed annular chamber between the first sleeve and the first shaft and a second sealed annular chamber between the first sleeve and the first shaft, the first sealed annular chamber being in fluid communication with the first fluid passage and the first outer hose connection location and the second sealed annular chamber being in fluid communication with the second outer hose connection location and the second fluid passage;

a second sleeve mounted on the second shaft and being configured to swivel about the second shaft, the second sleeve including a third outer hose connection location, the hydraulic swivel system defining a third sealed annular chamber between the second sleeve and the second shaft, the third sealed annular chamber being in fluid communication with the first fluid passage and the third outer hose connection location; and a third sleeve mounted on the second shaft and being configured to swivel about the second shaft, the third sleeve including a fourth outer hose connection location, the hydraulic swivel system defining a fourth sealed annular chamber between the third sleeve and the second shaft, the fourth sealed annular chamber being in fluid communication with the second fluid passage and the fourth outer hose connection location.

2. The hydraulic swivel system of claim 1, wherein the first and second shafts include internal ribs at least partially defining internal voids that are not in fluid communication with the first and second fluid passages.

3. The hydraulic swivel system of claim 2, wherein the internal ribs are radial ribs and the internal voids extend longitudinally through at least portions of the first and second shafts.

4. The hydraulic swivel system of claim 2, further comprising a first reinforcing rib unitary with the U-shaped fluid conveyance structure at a junction between the main body and the first shaft and a second reinforcing rib unitary with the U-shaped fluid conveyance structure at a junction between the main body and the second shaft.

5. The hydraulic swivel system of claim 2, further comprising an additional fluid conveyance structure having a monolithic construction provided by additive manufacturing, the additional fluid conveyance structure having a unitary body defining a third shaft and also defining fifth and sixth outer hose connection locations offset from the third shaft, wherein a fourth sleeve is mounted on the third shaft and is configured to swivel about the third shaft, wherein the fourth sleeve includes a seventh outer hose connection location, wherein the hydraulic swivel system defines a fifth sealed annular chamber between the fourth sleeve and the third shaft, wherein the fifth sealed annular chamber is in fluid communication with the seventh outer hose connection location, wherein the unitary body defines a third fluid passage that provides fluid communication between the fifth sealed annular chamber and the fifth outer hose connection location, wherein a fifth sleeve is mounted on the third shaft and is configured to swivel about the third shaft, wherein the fifth sleeve includes an eighth outer hose connection location, wherein the hydraulic swivel system defines a sixth sealed annular chamber between the fifth sleeve and the third shaft, wherein the sixth sealed annular chamber is in fluid communication with the eighth outer hose connection location, wherein the unitary body defines a fourth fluid passage that provides fluid communication between the sixth sealed annular chamber and the sixth outer hose connection location, wherein a first hose connects the third outer hose connection location to the seventh outer hose connection location, and wherein a second hose connects the fourth outer hose connection location to the eighth outer hose connection location.

6. The hydraulic swivel system of claim 5, wherein a metal band connects the second shaft to the third shaft, wherein the metal band extends between the first and second hoses.

7. The hydraulic swivel system of claim 2, wherein at least one of the first and second shafts includes at least one longitudinal cavity that is not in fluid communication with the first and second fluid passages.

* * * * *